US012592400B2

(12) United States Patent
Imanaka et al.

(10) Patent No.: US 12,592,400 B2
(45) Date of Patent: Mar. 31, 2026

(54) CELL STACK DEVICE, MODULE, AND MODULE HOUSING DEVICE

(71) Applicant: KYOCERA CORPORATION, Kyoto (JP)

(72) Inventors: Kazuya Imanaka, Kirishima (JP);
Fumito Furuuchi, Kirishima (JP);
Sasuke Shiramomo, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 770 days.

(21) Appl. No.: 17/916,457

(22) PCT Filed: Apr. 9, 2021

(86) PCT No.: PCT/JP2021/015086
§ 371 (c)(1),
(2) Date: Sep. 30, 2022

(87) PCT Pub. No.: WO2021/206175
PCT Pub. Date: Oct. 14, 2021

(65) Prior Publication Data
US 2023/0223565 A1      Jul. 13, 2023

(30) Foreign Application Priority Data

Apr. 9, 2020    (JP) ................................. 2020-070650

(51) Int. Cl.
*H01M 8/0282*        (2016.01)
*H01M 8/0258*        (2016.01)
(Continued)

(52) U.S. Cl.
CPC ....... *H01M 8/0282* (2013.01); *H01M 8/0258* (2013.01); *H01M 8/0273* (2013.01); *H01M 2008/1293* (2013.01)

(58) Field of Classification Search
CPC ............. H01M 8/0282; H01M 8/0258; H01M 8/0273; H01M 2008/1293; H01M 8/0206;
(Continued)

(56) References Cited

U.S. PATENT DOCUMENTS

2012/0315564 A1    12/2012  Fujimoto et al.
2021/0218046 A1     7/2021  Seno et al.

FOREIGN PATENT DOCUMENTS

JP          2013-012398 A      1/2013
JP             5230812 B2      7/2013
(Continued)

OTHER PUBLICATIONS

Menzler N H et al: "Studies of Material Interaction After Long-Term Stack Operation", Fuel Cells, Wiley-V C H Verlag GMBH & Co. KGAA, DE, vol. 7, No. 5, Sep. 19, 2007 (Sep. 19, 2007), pp. 356-363, XP072364200, ISSN: 1615-6846, DOI: 10.1002/FUCE. 200700001.

(Continued)

*Primary Examiner* — Helen Oi K Conley
(74) *Attorney, Agent, or Firm* — Procopio, Cory, Hargreaves & Savitch LLP

(57)                ABSTRACT

A cell stack device includes cells, a metal member containing chromium, a covering layer, and a bonding material. The cells include a first cell and the cells includes respective element portions. The covering layer covers the metal member. The bonding material is positioned between the first cell and the covering layer. The cell stack device satisfies any one of (1) The covering layer includes at least two portions having different thicknesses or different surface roughnesses at different positions. (2) A surface roughness of the covering layer is different from that of the metal member. (3) At least one element selected from the group consisting of Mn, Ti, Ca, and Al is positioned at the interface between the (Continued)

metal member and the covering layer, and the content ratio of the at least one element at the interface is different from that of the metal member or the covering layer.

14 Claims, 28 Drawing Sheets

(51) Int. Cl.
    *H01M 8/0273*         (2016.01)
    *H01M 8/12*           (2016.01)

(58) Field of Classification Search
    CPC .. H01M 8/021; H01M 8/0217; H01M 8/0228;
        H01M 8/2425; H01M 8/2432; H01M
        8/2483; H01M 8/04; H01M 8/12; H01M
        8/2475; H01M 8/248; H01M 8/2485;
        H01M 50/209; H01M 50/224; H01M
        8/2465; Y02E 60/50
    See application file for complete search history.

(56) References Cited

FOREIGN PATENT DOCUMENTS

| JP | 5266930 | B2 | 8/2013 | | |
| JP | 2015-162357 | A | 9/2015 | | |
| JP | 2018-055913 | A | 4/2018 | | |
| JP | 2018-106885 | A | 7/2018 | | |
| JP | 2018-139196 | A | 9/2018 | | |
| JP | 6484380 | B1 | 3/2019 | | |
| JP | 2019-215981 | A | 12/2019 | | |
| JP | 2019-215986 | A | 12/2019 | | |
| JP | 2020-043068 | A | 3/2020 | | |
| WO | WO-0122513 | * | 3/2001 | .......... | H01M 8/0258 |
| WO | WO-0122513 | A1 * | 3/2001 | .......... | H01M 8/0258 |
| WO | 2019/225235 | A1 | 11/2019 | | |

OTHER PUBLICATIONS

Smeacetto F et al: "Thermal cycling and ageing of a glass-ceramic sealant for planar SOFCs", International Journal of Hydrogen Energy, Elsevier, Amsterdam, NL, vol. 36, No. 18, Apr. 10, 2011 (Apr. 10, 2011), pp. 11895-11903, XP028271024, ISSN: 0360-3199, DOI: 10.1016/J.IJHYDENE.2011.04.083 [retrieved on Jun. 17, 2011].

Lacey R et al: "Evaluation of Co and perovskite Cr-blocking thin films on SOFC interconnects", Solid State Ionics, North Holland Pub. Company. Amsterdam; NL, NL, vol. 181, No. 27-28, Sep. 6, 2010 (Sep. 6, 2010), pp. 1294-1302, XP027241465, ISSN: 0167-2738 [retrieved on Aug. 12, 2010].

* cited by examiner 17a     17a1

17

17

13

17e   17f

17b

CELL STACK DEVICE, MODULE, AND MODULE HOUSING DEVICE

CROSS-REFERENCE TO RELATED APPLICATIONS

This application is national stage application of International Application No. PCT/JP2021/015086, filed on Apr. 9, 2021, which designates the United States, incorporated herein by reference, and which claims the benefit of priority from Japanese Patent Application No. 2020-070650, filed on Apr. 9, 2020, the entire contents of which are incorporated herein by reference.

TECHNICAL FIELD

The present disclosure relates to a cell stack device, a module, and a module housing device.

BACKGROUND OF INVENTION

In recent years, various fuel cell stack devices each including a plurality of fuel cells have been proposed as next-generation energy sources. The fuel cell is a type of cell capable of generating electrical power using a fuel gas such as a hydrogen-containing gas and an oxygen-containing gas such as air.

CITATION LIST

Patent Literature

Patent Document 1: JP 2015-162357 A

SUMMARY

According to an aspect of an embodiment, a cell stack device includes a plurality of cells, a metal member, a covering layer, and a bonding material. The plurality of cells include a first cell and each of the plurality of cells includes an element portion. The metal member contains chromium. The covering layer covers the metal member. The bonding material is positioned between the first cell and the covering layer. The cell stack device satisfies any one of the following (1) to (3).

(1) The covering layer includes at least two portions with different thicknesses or different surface roughnesses at different positions.

(2) A surface roughness of the covering layer is different from a surface roughness of the metal member.

(3) At least one element selected from the group consisting of Mn, Ti, Ca, and Al is positioned at an interface between the metal member and the covering layer, and a content ratio of the at least one element selected from the group consisting of Mn, Ti, Ca, and Al at the interface is different from a content ratio of Mn, Ti, Ca, and Al of the metal member or the covering layer.

A module of the present disclosure includes the cell stack device described above and a housing container that houses the cell stack device.

A module housing device of the present disclosure includes the module described above, an auxiliary device configured to operate the module, and an external case that houses the module and the auxiliary device.

DESCRIPTION OF EMBODIMENTS

Hereinafter, embodiments of a cell stack device, a module, and a module housing device disclosed in the present specification will be described with reference to the accompanying drawings. The disclosure is not limited by the following embodiment.

Note that the drawings are schematic and that the dimensional relationships between elements, the proportions thereof, and the like may differ from the actual ones. There may be differences between the drawings in the dimensional relationships, proportions, and the like.

Configuration of Cell

First, with reference to FIGS. 1A to 1C, a cell, which constitutes a cell stack device according to an embodiment, will be described using an example of a solid oxide fuel cell.

Figure 1A:
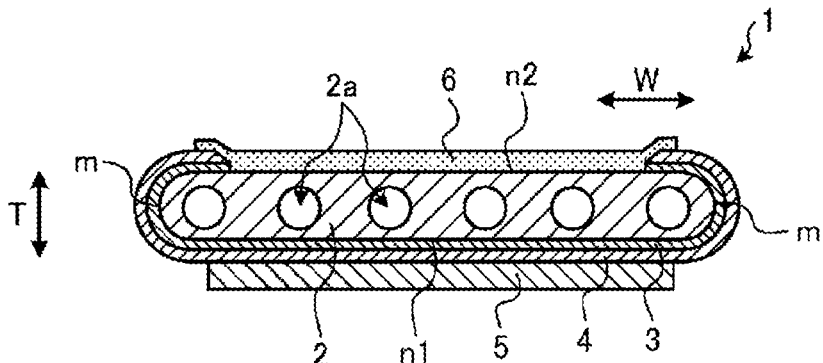
FIG. 1A is a horizontal cross-sectional view illustrating an example of a cell according to an embodiment.

FIG. 1A is a horizontal cross-sectional view illustrating an example of a cell 1 according to the embodiment. FIG. 1B is a side view illustrating the example of the cell 1 according to the embodiment when viewed from an air electrode 5 side. FIG. 1C is a side view illustrating the example of the cell 1 according to the embodiment when viewed from an interconnector 6 side. Note that FIGS. 1A to 1C each illustrate an enlarged part of a configuration of the cell 1.

Figure 1B:
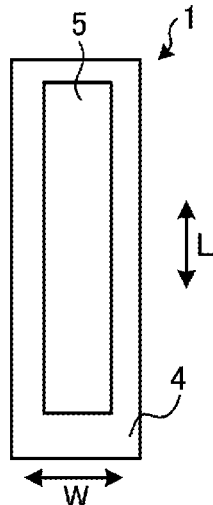
FIG. 1B is a side view illustrating the example of the cell according to the embodiment when viewed from an air electrode side.
Figure 1C:
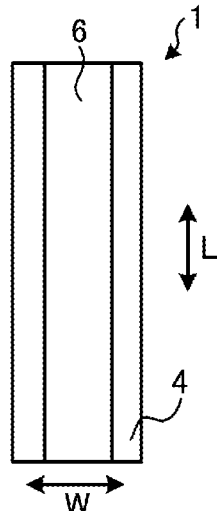
FIG. 1C is a side view illustrating the example of the cell according to the embodiment when viewed from an interconnector side.

In the example illustrated in FIGS. 1A to 1C, the cell 1 is hollow and flat plate-shaped, and has an elongated plate shape. As illustrated in FIG. 1B, the overall shape of the cell 1 when viewed from the side is, for example, a rectangle having a side length of from 5 cm to 50 cm in a length direction L and a length of from 1 cm to 10 cm in a width direction W orthogonal to the length direction L. A thickness of the entire cell 1 in a thickness direction T is, for example, 1 mm to 5 mm.

As illustrated in FIG. 1A, the cell 1 includes a support substrate 2 that is conductive, an element portion, and an interconnector 6. The support substrate 2 has a columnar shape having a pair of flat surfaces n1 and n2 on opposite sides from each other, and a pair of arc-shaped side surfaces m connecting the flat surfaces n1 and n2.

The element portion is provided on the flat surface n1 of the support substrate 2. The element portion includes a fuel electrode 3, a solid electrolyte layer 4, and an air electrode 5. In the example illustrated in FIG. 1A, the interconnector 6 is provided on the flat surface n2 of the support substrate 2.

As illustrated in FIG. 1B, the air electrode 5 does not extend to the upper and lower ends of the cell 1. At a lower end portion of the cell 1, only the solid electrolyte layer 4 is exposed to the surface. As illustrated in FIG. 1C, the interconnector 6 may extend to the upper and lower ends of the cell 1. At the lower end portion of the cell 1, the interconnector 6 and the solid electrolyte layer 4 are exposed to the surface. Note that, as illustrated in FIG. 1A, the solid electrolyte layer 4 is exposed to the surfaces of the pair of arc-shaped side surfaces m of the cell 1. The interconnector 6 need not extend to the lower end of the cell 1.

Hereinafter, each of constituent members constituting the cell 1 will be described.

The support substrate 2 is internally provided with gas-flow passages 2a through which a gas flows. An example of the support substrate 2 illustrated in FIG. 1A includes six of the gas-flow passages 2a. The support substrate 2 has gas permeability, and transmits the fuel gas flowing in the gas-flow passage 2a to the fuel electrode 3. The support substrate 2 may have conductivity. The support substrate 2 having conductivity causes electricity generated in the element portion to be collected in the interconnector 6.

The material of the support substrate 2 contains, for example, an iron group metal component and an inorganic oxide. For example, the iron group metal component may be Ni (nickel) and/or NiO. For example, the inorganic oxide may be a specific rare earth element oxide.

As the material of the fuel electrode 3, a commonly known material may be used. As the material of the fuel electrode 3, a porous conductive ceramic, for example, a ceramic containing $ZrO_2$ in which calcium oxide, magnesium oxide, or a rare earth element oxide is contained as a solid solution, and Ni and/or NiO may be used. As the rare earth element oxide, for example, $Y_2O_3$, $Yb_2O_3$, or the like is used. Hereinafter, $ZrO_2$ in which calcium oxide, magnesium oxide, or a rare earth element oxide is contained as a solid solution may be referred to as stabilized zirconia. The stabilized zirconia also includes partially stabilized zirconia.

The solid electrolyte layer 4 is an electrolyte and bridges ions between the fuel electrode 3 and the air electrode 5. At the same time, the solid electrolyte layer 4 has gas blocking properties, and makes leakage of the fuel gas and the oxygen-containing gas less likely to occur.

The material of the solid electrolyte layer 4 may be, for example, $ZrO_2$ in which 3 mole % to 15 mole % of a rare earth element oxide is contained as a solid solution. As the rare earth element oxide, for example, $Y_2O_3$, $Yb_2O_3$, or the like is used. Note that another material may be used as the material of the solid electrolyte layer 4, as long as the material has the above-described characteristics.

The material of the air electrode 5 is not particularly limited, as long as the material is commonly used for an air electrode. The material of the air electrode 5 may be, for example, a conductive ceramic such as an $ABO_3$ type perovskite oxide.

The material of the air electrode 5 may be, for example, a composite oxide in which Sr and La coexist in an A site. Examples of such a composite oxide include $La_xSr_{1-x}Co_yFe_{1-y}O_3$, $La_xSr_{1-x}MnO_3$, $La_xSr_{1-x}FeO_3$, and $La_xSr_{1-x}CoO_3$. Here, x is 0<x<1, and y is 0<y<1.

The air electrode 5 has gas permeability. The open porosity of the air electrode 5 may be, for example, 20% or more, and particularly may be in a range from 30% to 50%.

As the material of the interconnector 6, a lanthanum chromite-based perovskite oxide ($LaCrO_3$-based oxide), a lanthanum strontium titanium-based perovskite oxide ($LaSrTiO_3$-based oxide), or the like may be used. These materials have conductivity, and are neither reduced nor oxidized even when in contact with a fuel gas such as a hydrogen-containing gas and an oxygen-containing gas such as air.

The interconnector 6 is dense, and makes the leakage of the fuel gas flowing through the gas-flow passages 2a positioned inside the support substrate 2, and of the oxygen-containing gas flowing outside the support substrate 2 less likely to occur. The interconnector 6 may have a relative density of 93% or more, particularly 95% or more.

Configuration of Cell Stack Device

Figure 2A:
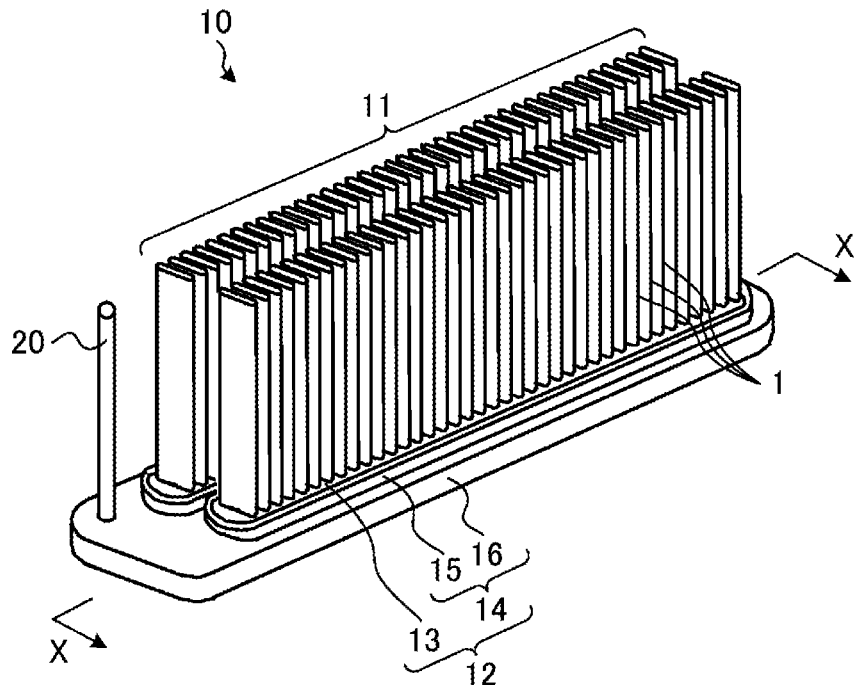
FIG. 2A is a perspective view illustrating an example of a cell stack device according to the embodiment.
Figure 2B:
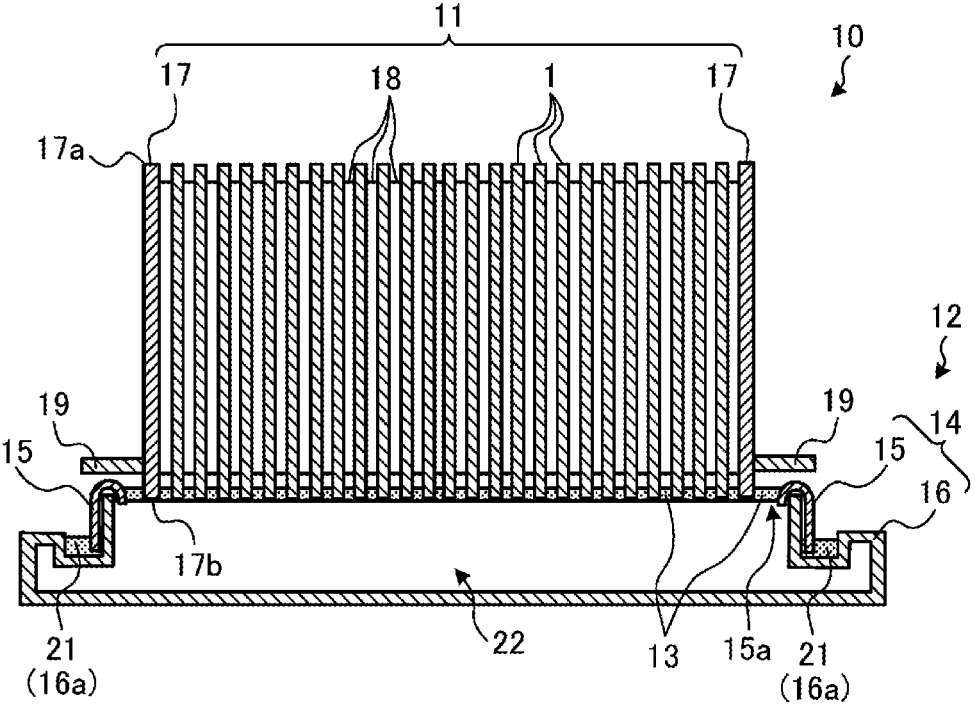
FIG. 2B is a cross-sectional view taken along a line X-X illustrated in FIG. 2A.
Figure 2C:
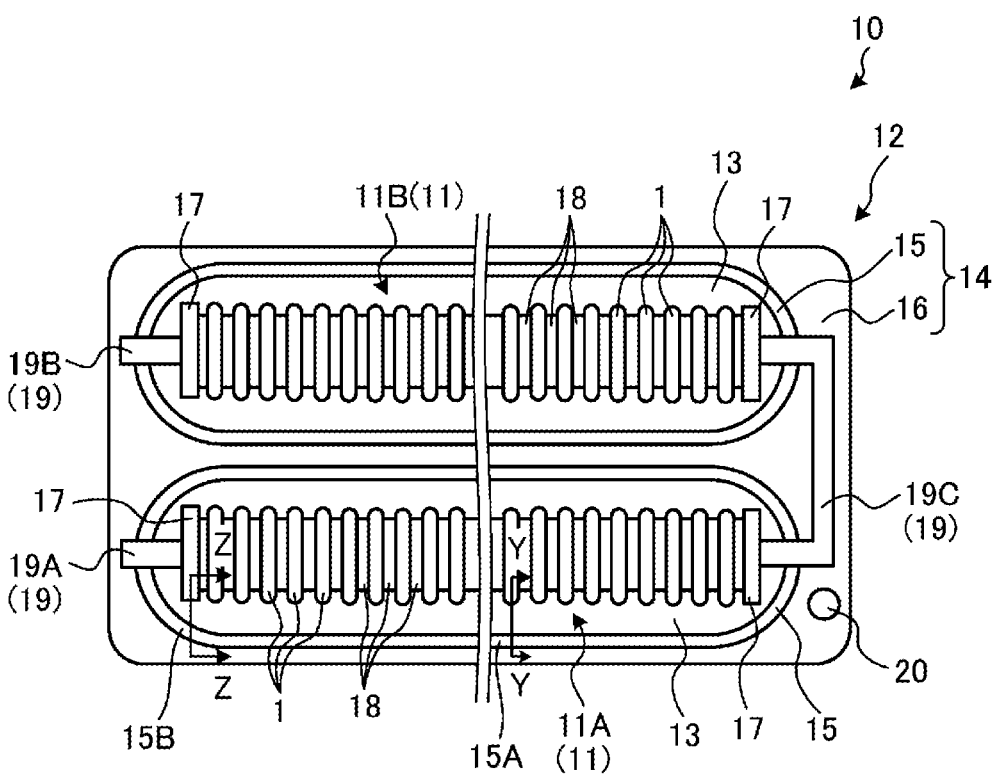
FIG. 2C is a top view illustrating the example of the cell stack device according to the embodiment.

A cell stack device 10 according to the present embodiment using the cell 1 described above will be described with reference to FIGS. 2A to 2C. FIG. 2A is a perspective view illustrating an example of the cell stack device 10 according to the embodiment. FIG. 2B is a cross-sectional view taken along a line X-X illustrated in FIG. 2A. FIG. 2C is a top view illustrating the example of the cell stack device 10 according to the embodiment.

As illustrated in FIG. 2A, the cell stack device 10 includes a cell stack 11 that includes a plurality of cells 1 arrayed (stacked) in the thickness direction T (see FIG. 1A) of the cell 1, and a fixing member 12. The cell stack 11 may include at least one cell 1. When only one cell 1 is provided as a first cell, the term "a cell stack 11" or "a cell stack device 10" may be used for the sake of simplicity.

The fixing member 12 includes a bonding material 13 and a support member 14. The support member 14 supports the cells 1. The bonding material 13 bonds the cells 1 and the support member 14 together. The support member 14 includes a support body 15 and a gas tank 16. The support body 15 and the gas tank 16, as the support member 14, are made of metal and electrically conductive.

As illustrated in FIG. 2B, the support body 15 includes an insertion hole 15a into which the lower end portions of the plurality of cells 1 are inserted. The lower end portions of the plurality of cells 1 and an inner wall of the insertion hole 15a are bonded by the bonding material 13.

The gas tank 16 includes an opening portion through which a reaction gas is supplied to the plurality of cells 1 via the insertion hole 15a, and a recessed groove 16a positioned in the periphery of the opening portion. An outer peripheral end portion of the support body 15 is fixed to the gas tank 16 by a fixing material 21 filled in the recessed groove 16a of the gas tank 16.

In the example illustrated in FIG. 2B, the fuel gas is stored in an internal space 22 formed by the support body 15 and the gas tank 16, which constitute the support member 14. A gas circulation pipe 20 is connected to the gas tank 16. The fuel gas is supplied to the gas tank 16 through this gas circulation pipe 20, and is supplied from the gas tank 16 to the gas-flow passages 2a (see FIG. 1A) inside the cells 1. The fuel gas supplied to the gas tank 16 is produced by a reformer 102 (see FIG. 9), which will be described below.

A hydrogen-rich fuel gas can be produced, for example, by steam reforming a raw fuel. When the fuel gas is produced by steam reforming, the fuel gas contains steam.

In the example illustrated in FIG. 2A, two rows of cell stacks 11, each having the plurality of cells 1, two support bodies 15, and the gas tank 16 are provided. The two rows of cell stacks 11 each have a plurality of cells 1. Each of the cell stacks 11 is fixed to a corresponding one of the support bodies 15. The gas tank 16 includes two through holes in an upper surface thereof. Each of the support bodies 15 is disposed in a corresponding one of the through holes. The internal space 22 is formed by the single gas tank 16 and the two support bodies 15.

The insertion hole 15a has, for example, an oval shape in a top surface view. The length of the insertion hole 15a, for example, in an array direction of the cells 1, that is, the thickness direction T thereof, is greater than the distance between two end current collectors 17 positioned at two ends of the cell stack 11. The width of the insertion hole 15a is, for example, greater than the length of the cell 1 in the width direction W (see FIG. 1A). Note that the shape of the insertion hole 15a may be a substantially rectangular shape that is long in the array direction of the cells 1.

As illustrated in FIG. 2B, the bonding material 13 is filled and solidified in a bonding portion between the inner wall of the insertion hole 15a and the lower end portions of the cells 1. As a result, the inner wall of the insertion hole 15a and the lower end portions of the plurality of cells 1 are bonded and fixed respectively, and the lower end portions of the cells 1 are bonded and fixed to each other. The gas-flow passages 2a of each cell 1 communicate with the internal space 22 of the support member 14 at the lower end portion of the cell 1.

As the bonding material 13 and the fixing material 21, a material having low conductivity such as glass can be used. As a specific material of the bonding material 13 and the fixing material 21, amorphous glass or the like may be used, and particularly, crystallized glass or the like may be used.

As the crystallized glass, for example, any one of $SiO_2$—CaO-based, MgO—$B_2O_3$-based, $La_2O_3$—$B_2O_3$—MgO-based, $La_2O_3$—$B_2O_3$—ZnO-based, and $SiO_2$—CaO—ZnO-based materials may be used, or particularly, a $SiO_2$—MgO-based material may be used.

As illustrated in FIG. 2B, a conductive member 18 is interposed between the adjacent cells 1 among the plurality of cells 1. The conductive member 18 electrically connects in series the fuel electrode 3 of one of the adjacent cells 1 with the air electrode 5 of the other of the adjacent cells 1. More specifically, the conductive member 18 electrically connects the interconnector 6 electrically connected to the fuel electrode 3 of the one of the adjacent cells 1 and the air electrode 5 of the other one of the adjacent cells 1.

As illustrated in FIG. 2B, the end current collectors 17 are electrically connected to the cells 1 positioned at the outermost sides in the array direction of the plurality of cells 1. The end current collectors 17 are each connected to an electrically conductive portion 19 protruding outward from the cell stack 11. The electrically conductive portion 19 collects electricity generated by the cells 1, and conducts the electricity to the outside. Note that in FIG. 2A, the end current collectors 17 are not illustrated.

As illustrated in FIG. 2C, in the cell stack device 10, two cell stacks 11A and 11B, which are connected in series, function as one battery. Thus, the electrically conductive portion 19 of the cell stack device 10 is divided into a positive electrode terminal 19A, a negative electrode terminal 19B, and a connection terminal 19C.

The positive electrode terminal 19A functions as a positive electrode when the electrical power generated by the cell stack 11 is output to the outside, and is electrically connected to the end current collector 17 on a positive electrode side in the cell stack 11A. The negative electrode terminal 19B functions as a negative electrode when the electrical power generated by the cell stack 11 is output to the outside, and is electrically connected to the end current collector 17 on a negative electrode side in the cell stack 11B.

The connection terminal 19C electrically connects the end current collector 17 on a negative electrode side in the cell stack 11A and the end current collector 17 on a positive electrode side in the cell stack 11B.

Bonding Between Support Body and Cell

Figure 3A:
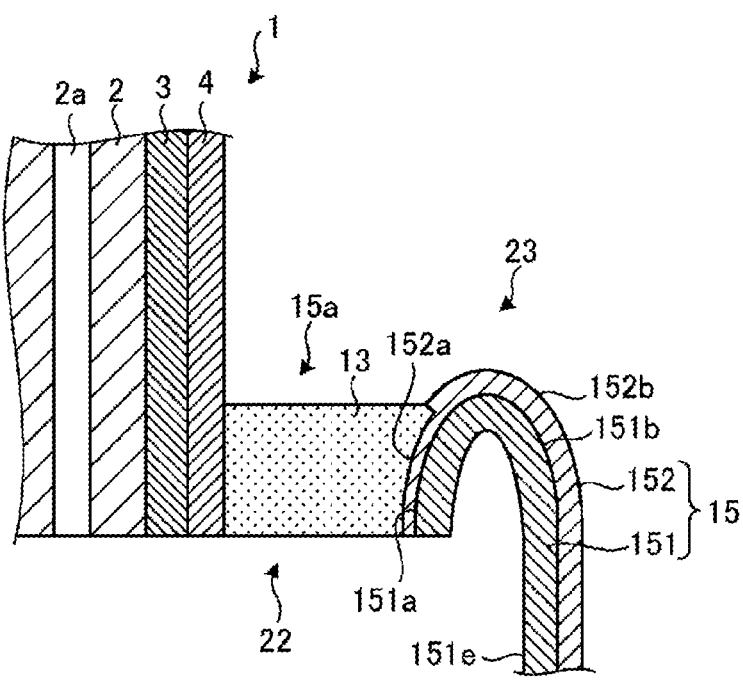
FIG. 3A is a cross-sectional view taken along a line Y-Y illustrated in FIG. 2C.
Figure 3B:
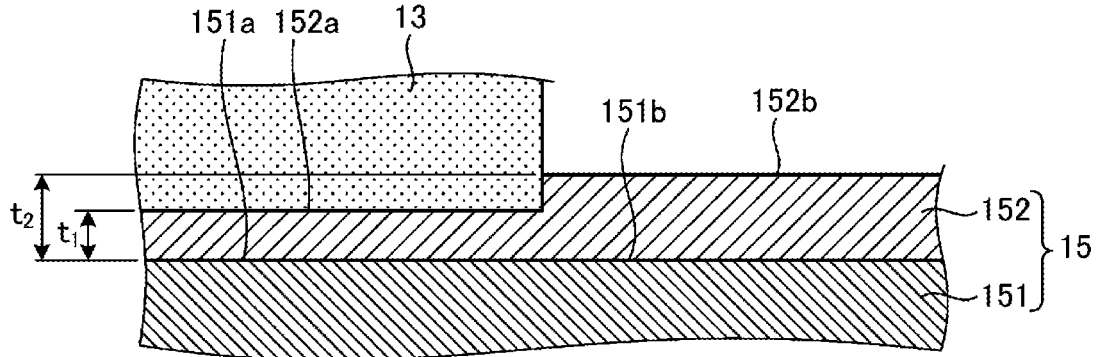
FIG. 3B is an enlarged cross-sectional view schematically illustrating a main part of a cell stack illustrated in FIG. 3A.

Next, bonding between the support body 15 and the cell 1 will be described with reference to FIGS. 3A and 3B. FIG. 3A is a cross-sectional view taken along a line Y-Y illustrated in FIG. 2C. FIG. 3B is an enlarged cross-sectional view schematically illustrating a main part of the cell stack illustrated in FIG. 3A. In FIG. 3B, a surface of a base member 151, which constitutes the support body 15, is simplified and illustrated in a planar shape.

As illustrated in FIGS. 3A and 3B, the support body 15 is bonded to the cell 1 with the bonding material 13 interposed therebetween.

The support body 15 includes the base member 151 and a covering layer 152. The base member 151 has electrical conductivity and heat resistance. The base member 151 contains chromium. The base member 151 is, for example, stainless steel. The base member 151 is an example of a metal member. The base member 151 may, for example, contain a metal oxide.

The covering layer 152 covers the base member 151. The covering layer 152 is positioned so as to be in contact with a first surface 151a and a second surface 151b of the base member 151.

The covering layer 152 includes a first surface 152a facing the bonding material 13, and a second surface 152b exposed to an oxidizing atmosphere (external space 23). The first surface 152a is an example of a first outer surface or a third outer surface. The second surface 152b is an example of a second outer surface or a fourth outer surface.

The material of the covering layer 152 is, for example, an inorganic oxide. The inorganic oxide may be, for example, aluminum oxide (alumina), magnesium oxide (magnesia), silicon oxide (silica), zirconium oxide (zirconia), chromium oxide (chromia), titanium oxide (titania), or a composite oxide thereof. The zirconia may be stabilized zirconia. The composite oxide may be selected from forsterite, cordierite, and the like, for example. The material of the covering layer 152 may be a material having low conductivity, or may be an insulating material. As a result of the material of the covering layer 152 being a material having a low conductivity or being an insulating material, the cell stack device 10 that has a high withstand voltage and a high insulating resistance can be obtained.

In particular, each of alumina and forsterite has a small difference in the thermal expansion coefficient with the base member 151, and thermal stress generated between the covering layer 152 and the base member 151 due to a temperature change decrease. Thus, the covering layer 152 can be firmly bonded to the base member 151, and the covering layer 152 is less likely to peel off from the base member 151.

As a result of the covering layer 152 being positioned between the bonding material 13 and the base member 151, stress generated between the bonding material 13 and the base member 151 due to a difference in the thermal expansion coefficient is alleviated, and the likelihood of crack occurrence at the bonding material 13 is reduced.

The second surface 152b of the covering layer 152, on which the bonding material 13 is not positioned, is exposed to the external space 23. The external space 23 is a space to which the air electrode 5 of the cell 1 (see FIG. 1) is exposed, and is filled with an oxygen-containing gas (such as air). In other words, the external space 23 is an oxidizing atmosphere.

As described above, the base member 151 contains chromium (Cr). For example, when chromium (Cr) contained in the base member 151 is released into the oxidizing atmosphere (external space 23), the performance of the air electrode 5 may be reduced.

In the embodiment, the thickness of the covering layer 152 facing the oxidizing atmosphere (external space 23) can be increased. In the embodiment, as illustrated in FIG. 3B, a thickness t2 of the covering layer 152 where the second surface 152b is positioned is greater than a thickness t1 of the covering layer 152 where the first surface 152a is positioned.

As a result, for example, during high-temperature operation, chromium contained in the base member 151 can be made less likely to be released into the oxidizing atmosphere (external space 23). Thus, according to the embodiment, the durability of the air electrode 5 can be improved, and thus, the durability of the cell stack device 10 can be improved.

On the other hand, the covering layer 152 is bonded to the bonding material 13, and depending on the operating environment, the fuel gas may leak from the gap formed between the support body 15 and the bonding material 13 due to peeling of the covering layer 152 from the bonding material 13, thereby reducing the durability of the cell stack device 10.

In the embodiment, the surface roughness of the covering layer 152 can be greater than the surface roughness of the base member 151. Specifically, for example, the surface roughness of the first surface 152a of the covering layer 152 may be greater than the surface roughness of the first surface 151a of the base member 151.

As a result, the adhesiveness between the covering layer 152 and the bonding material 13 can be increased. Thus, for example, the support body 15 is less likely to peel off from the bonding material 13, and thus, fuel gas leakage can be made less likely to occur. Thus, according to the embodiment, the durability of the support body 15 can be improved, and thus, the durability of the cell stack device 10 can be improved.

Note that the surface roughness of the second surface 152b of the covering layer 152 may be the same as or different from the surface roughness of the first surface 152a. The surface roughness of the second surface 151b of the base member 151 may be the same as or different from the surface roughness of the first surface 151a.

In the embodiment, the bonding strength between the covering layer 152 and the base member 151 may be increased by adjusting the porosity of the covering layer 152. The thickness of the covering layer 152 positioned between the second surface 152b and the base member 151 is greater than the thickness of the covering layer 152 positioned between the first surface 152a and the base member 151, and thus, the covering layer 152 positioned at the second surface 152b is likely to be subjected to high stress and is more likely to peel off from the base member 151 than the covering layer 152 positioned at the first surface 152a. Specifically, for example, the covering layer 152 positioned between the second surface 152b and the base member 151 (at the second surface 151b) can have a greater porosity than the covering layer 152 positioned between the first surface 152a and the base member 151 (at the first surface 151a).

This makes it possible to increase stress relief in the covering layer 152 positioned on the second surface 152b, and thus increase the bonding strength between the covering layer 152 and the base member 151. Therefore, for example, the covering layer 152 is less likely to peel off from the base member 151, and chromium contained in the base member 151 can be made less likely to be released into the oxidizing atmosphere (external space 23). Thus, according to the embodiment, the durability of the air electrode 5 can be improved, and thus, the durability of the cell stack device 10 can be improved.

In the embodiment, the bonding strength between the covering layer 152 and the bonding material 13 may be increased by adjusting the content ratio of the metal elements positioned at the interface between the base member 151 and the covering layer 152. Specifically, for example, at the first surface 151a and the second surface 151b corresponding to the interface between the base member 151 and the covering layer 152, at least one element selected from the group consisting of Mn, Ti, Ca, and Al is positioned. When the covering layer 152 does not contain any of Mn, Ti, Ca, and Al as a main component, the content ratio of Mn, Ti, Ca, and Al positioned at the first surface 151a and the second surface 151b may be greater than the content ratios of Mn, Ti, Ca, and Al positioned in the base member 151 and the covering layer 152. These metal elements may diffuse mutually between the base member 151 and the covering layer 152.

As a result, the adhesiveness between the base member 151 and the covering layer 152 can be increased. Thus, for example, the base member 151 and the covering layer 152 are less likely to peel off, thereby making the fuel gas leakage less likely to occur. Thus, according to the embodiment, the durability of the support body 15 can be improved, and thus, the durability of the cell stack device 10 can be improved.

Note that the above-described metal elements positioned at the interface between the base member 151 and the covering layer 152 can be positioned as single elements, alloys, metal oxides, or composite oxides. The metal elements may be positioned on either the base member 151 side or the covering layer 152 side, and may be positioned across the base member 151 and the covering layer 152.

In particular, Mn may be positioned in a protruding portion of the base member 151 or in a recessed portion or pore of the covering layer 152. Ti may be positioned in a recessed portion of the base member 151 or in a pore of the covering layer 152. Ca may be positioned in a protruding portion of the base member 151 or in a recessed portion or pore of the covering layer 152. Al may be positioned in a protruding portion of the base member 151 or in a recessed portion or pore of the covering layer 152.

Bonding Between Support Body and End Current Collector

Figure 4:
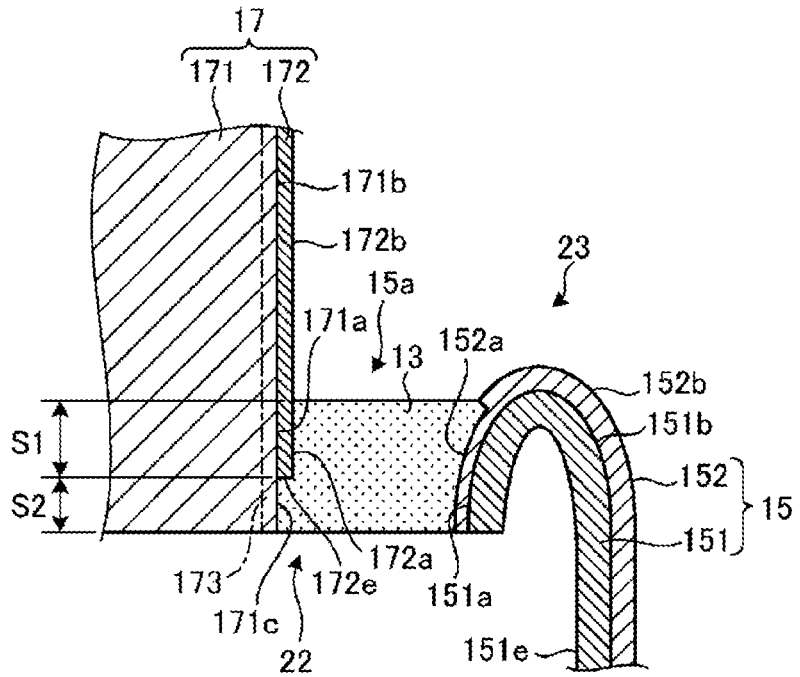
FIG. 4 is a cross-sectional view taken along a line Z-Z illustrated in FIG. 2C.

Bonding of the support body 15 and the end current collector 17 will be described with reference to FIG. 4. FIG. 4 is a cross-sectional view taken along a line Z-Z illustrated in FIG. 2C.

As illustrated in FIG. 4, the end current collector 17 is bonded to the support body 15 with the bonding material 13 interposed therebetween.

The end current collector 17 includes a base material 171 and a covering material 172. A surface of the base material 171 is covered with the covering material 172, for example, to suppress release of chromium (Cr) contained in the base material 171 into the oxidizing atmosphere (external space 23) during high-temperature operation, thereby enhancing the durability of the end current collector 17.

The base material 171 is, for example, a conductive material containing chromium (Cr). The base material 171 may be, for example, stainless steel.

The material of the covering material 172 may be, for example, an inorganic oxide. The covering material 172 may be a conductive oxide containing manganese (Mn) (e.g., $Mn_{1.5}Co_{1.5}O_4$, $ZnMnCoO_4$, etc.). The covering material 172 can be positioned on a surface of the base material 171 by, for example, electrodeposition coating or the like.

The covering material 172 covers the base material 171. The covering material 172 is positioned so as to cover a surface 171a and a surface 171b of the base material 171. The covering material 172 has a surface 172a facing the bonding material 13, and a surface 172b exposed to the oxidizing atmosphere (external space 23).

As a result of the covering material 172 being positioned between the bonding material 13 and the base material 171, stress generated between the bonding material 13 and the base material 171, for example, due to a difference in the thermal expansion coefficient is alleviated, and the likelihood of a crack occurring at the bonding material 13 is reduced.

The base material 171 has a surface 171c adjacent to the surface 171a and facing the bonding material 13. That is, one end (lower end portion) 172e of the covering material 172 faces the bonding material 13 and does not face the internal space 22.

In the embodiment, the surface roughness of the covering material 172 facing the bonding material 13 can be greater than the surface roughness of the covering material 172 not facing the bonding material 13. Specifically, for example, the surface roughness of the surface 172a of the covering material 172 may be greater than the surface roughness of the surface 172b.

As a result, the adhesiveness between the covering material 172 and the bonding material 13 can be increased. Thus, the end current collector 17 is less likely to peel off from the bonding material 13, and thus, fuel gas leakage can be made less likely to occur. Thus, according to the embodiment, the durability of the end current collector 17 can be enhanced, thereby enhancing the durability of the cell stack device 10.

In the embodiment, the surface roughness of the base material 171 facing the bonding material 13 can be greater than the surface roughness of the covering material 172 facing the bonding material 13. Specifically, for example, the surface roughness of the surface 171c of the base material 171 may be greater than the surface roughness of the surface 172a.

This can enhance the adhesiveness between the end current collector 17 and the bonding material 13. Thus, the end current collector 17 is less likely to peel off from the bonding material 13, and thus, fuel gas leakage can be made less likely to occur. Thus, according to the embodiment, the durability of the end current collector 17 can be enhanced, thereby enhancing the durability of the cell stack device 10.

As a result of the surface roughness of the surface 172a being smaller than the surface roughness of the surface 171c, for example, during high-temperature operation, chromium contained in the base material 171 can be made less likely to be released into the oxidizing atmosphere (external space 23) via the covering material 172. Thus, according to the embodiment, the durability of the end current collector 17 can be enhanced, thereby enhancing the durability of the cell stack device 10.

In the embodiment, the area of the surface 171c may be smaller than the area of the surface 172a. Specifically, for example, an area S2 of the surface 171c may be smaller than an area 51 of the surface 172a.

This suppresses, for example, the release of chromium contained in the base material 171 into the oxidizing atmosphere (external space 23) through the covering material 172 during high-temperature operation, and suppresses the occurrence of fuel gas leakage by suppressing peeling of the end current collector 17 from the bonding material 13. Thus, the embodiment can enhance the durability of the end current collector 17, thereby enhancing the durability of the cell stack device 10.

Note that the surface roughness of the surface 171b of the base material 171 can be smaller than the surface roughness of the surface 171a. For example, as a result of the surface roughness of the surface 171b being smaller than the surface roughness of the surface 171a, for example, chromium contained in the base material 171 can be made less likely to be released into the oxidizing atmosphere (external space 23) via the surface 172b of the covering material 172 during high-temperature operation. Note that the surface roughness of the surface 171a may be the same as the surface roughness of the surface 171b.

The base material 171 may include an oxide layer 173 positioned to face the covering material 172 and the bonding material 13. The oxide layer 173 may be, for example, a natural oxide film constituted by chromium oxide ($Cr_2O_3$).

In the oxide layer 173, for example, the constituent element seldom causes a reduction reaction even in a reducing atmosphere. By including the oxide layer 173, the release of the constituent elements of the base material 171 from the surface exposed to the reducing atmosphere (internal space 22) can be suppressed. Thus, according to the embodiment, the durability of the end current collector 17 can be enhanced, thereby enhancing the durability of the cell stack device 10.

On the other hand, as illustrated in FIG. 2C, the support body 15 is positioned so as to surround the periphery of the bonding material 13 that fills the oval-shaped insertion hole 15a in a top surface view. The insertion hole 15a of the support body 15 has a straight portion (first portion 15A) that extends linearly along the array direction, that is, the thickness direction T (see FIG. 1A), of the cells 1 as a first direction, and a bent portion (second portion 15B) that bends from the first direction. The cells 1 are positioned so as to face the first portion 15A of the support body 15, and the end current collector 17 is positioned so as to face the second portion 15B of the support body 15.

In the embodiment, the thickness of the covering layer 152 positioned in the second portion 15B of the support body 15 may be greater than the thickness of the covering layer 152 positioned in the first portion 15A. Specifically, the thickness t1 (see FIG. 3B) of the covering layer 152 where the first surface 152a is positioned, is greater in the second portion 15B than in the first portion 15A.

In the second portion 15B of the support body 15 that is bent in a top surface view, stress due to the difference in thermal expansion between the members is more likely to be concentrated as compared with the first portion 15A. In this manner, by varying the thickness of the covering layer 152 where the first surface 152a is positioned according to the shape of the support body 15, in particular the insertion hole 15a, in a top surface view, the concentration of stress in the second portion 15B, for example, can be alleviated. Thus, according to the embodiment, the durability of the support body 15 can be improved, and thus, the durability of the cell stack device 10 can be improved.

Note that in the embodiment, an inner surface 151e is described as being exposed to the reducing atmosphere (internal space 22), but it is not limited thereto, and, for example, a covering layer positioned to cover the inner surface 151e may be provided.

Variations

Figure 5A:
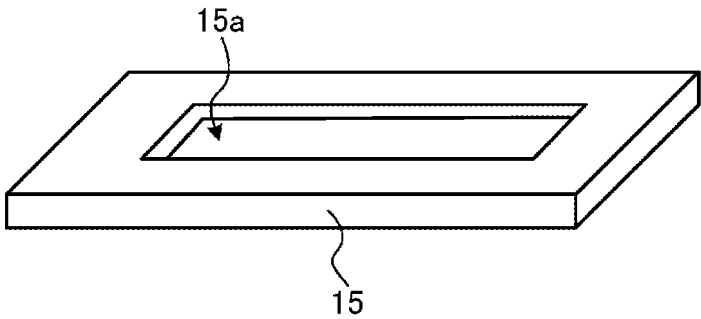
FIG. 5A is a perspective view illustrating another example of a metal member.
Figure 5B:
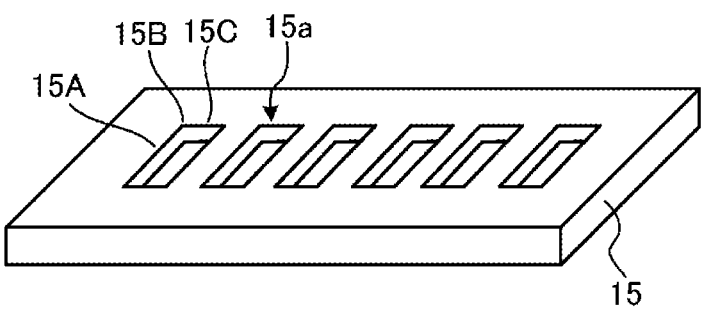
FIG. 5B is a perspective view illustrating another example of a metal member.

Next, the support body 15 according to variations of the embodiment will be described with reference to FIGS. 5A to 7B. FIGS. 5A and 5B are perspective views illustrating other examples of the metal member.

When the flat plate-shaped support body 15 as illustrated in FIG. 5A is used, the internal space 22 (see FIG. 2B) is formed as, for example, a result of the gas tank 16 (see FIG. 2A) being bonded to the lower surface or the side surface of the support body 15, which has the flat plate shape. The support body 15 illustrated in FIG. 5B has a plurality of insertion holes 15a. In this case, the cells 1 may be inserted into the plurality of insertion holes 15a of the support body 15 in a one-to-one manner, or a plurality of the cells 1 may be inserted into each of the plurality of insertion holes 15a of the support body 15.

Figure 5C:
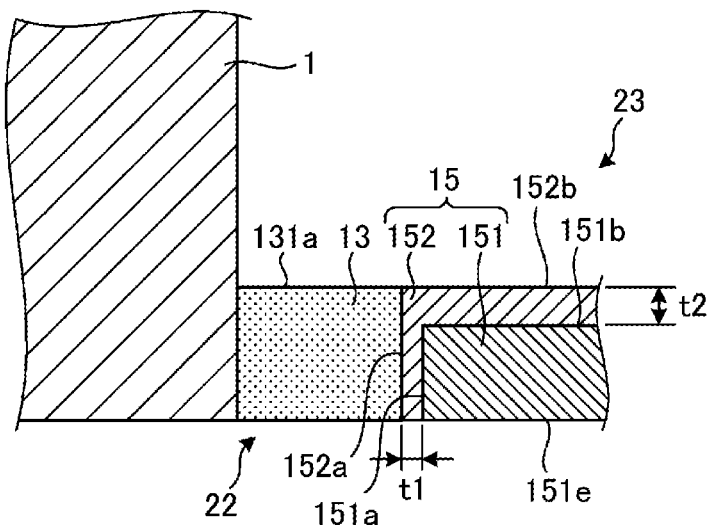
FIG. 5C is an enlarged cross-sectional view of a bonding portion between the metal member as the other example and the cell.

FIG. 5C is an enlarged cross-sectional view of a bonding portion between the metal member as another example and the cell. As illustrated in FIG. 5C, the support body 15 has a flat plate shape. The support body 15 is bonded to the cell 1 with the bonding material 13 interposed therebetween.

The support body 15 includes the base member 151 and the covering layer 152. The base member 151 includes the first surface 151a, the second surface 151b, and the inner surface 151e. The first surface 151a and the second surface 151b face the covering layer 152. The inner surface 151e faces the reducing atmosphere (internal space 22).

The covering layer 152 covers the base member 151. The covering layer 152 is positioned between the first surface 151a of the base member 151 and the bonding material 13. The covering layer 152 is positioned between the second surface 151b of the base member 151 and the oxidizing atmosphere (external space 23). The covering layer 152 includes the first surface 152a and the second surface 152b. The first surface 152a faces the bonding material 13. The second surface 152b faces the oxidizing atmosphere (external space 23).

The bonding material 13 bonds the cell 1 and the support body 15 together. The bonding material 13 is positioned between the solid electrolyte layer 4 of the cell 1 (see FIG. 1A) and the covering layer 152 of the support body 15, and bonds together the cell 1 and the first surface 152a, which serves as the first outer surface of the covering layer 152.

In the support body 15 according to the embodiment, the thickness t2 of the covering layer 152 where the second surface 152b of the covering layer 152 exposed to the oxidizing atmosphere (external space 23) is positioned is greater than the thickness t1 of the covering layer 152 where the first surface 152a facing the bonding material 13 is positioned.

As a result, for example, during high-temperature operation, chromium contained in the base member 151 can be made less likely to be released into the oxidizing atmosphere (external space 23). Thus, according to the embodiment, the durability of the air electrode 5 can be improved, and thus, the durability of the cell stack device 10 can be improved.

On the other hand, the covering layer 152 is bonded to the bonding material 13, and depending on the operating environment, the fuel gas may leak from the gap formed between the support body 15 and the bonding material 13 due to peeling of the covering layer 152 from the bonding material 13, thereby reducing the durability of the cell stack device 10.

In the embodiment, the surface roughness of the covering layer 152 can be greater than the surface roughness of the base member 151. Specifically, for example, the surface roughness of the first surface 152a of the covering layer 152 may be greater than the surface roughnesses of the first surface 151a and the second surface 151b of the base member 151.

As a result, the adhesiveness between the covering layer 152 and the bonding material 13 can be increased. Thus, for example, the support body 15 is less likely to peel off from the bonding material 13, and thus, fuel gas leakage can be made less likely to occur. Thus, according to the embodiment, the durability of the support body 15 can be improved, and thus, the durability of the cell stack device 10 can be improved.

Note that the surface roughness of the second surface 151b of the base member 151 may be the same as or different from the surface roughness of the first surface 151a. The surface roughness of the second surface 152b of the covering layer 152 may be the same as or different from the surface roughness of the first surface 152a. For example, the second surface 152b may have a smaller surface roughness than the first surface 152a. As a result, for example, during high-temperature operation, chromium (Cr) contained in the base member 151 can be made less likely to be released into the oxidizing atmosphere (external space 23) via the second surface 152b of the covering layer 152. Thus, the durability of the support body 15 can be improved, and thus, the durability of the cell stack device 10 can be improved.

In the embodiment, the bonding strength between the covering layer 152 and the bonding material 13 may be increased by adjusting the porosity of the covering layer 152. Specifically, for example, the covering layer 152 positioned between the second surface 152b and the second surface 151b of the base member 151 can have a greater porosity than the covering layer 152 positioned between the first surface 152a and the first surface 151a of the base member 151.

This makes it possible to increase stress relief in the covering layer 152 positioned on the second surface 152b, and thus increase the bonding strength between the covering layer 152 and the bonding material 13. Thus, the support body 15 is less likely to peel off from the bonding material 13, and fuel gas leakage can be made less likely to occur. Thus, according to the embodiment, the durability of the support body 15 can be improved, and thus, the durability of the cell stack device 10 can be improved.

In the embodiment, the bonding strength between the covering layer 152 and the bonding material 13 may be increased by adjusting the content ratio of the metal elements positioned at the interface between the base member 151 and the covering layer 152. Specifically, for example, at the first surface 151a and the second surface 151b corresponding to the interface between the base member 151 and the covering layer 152, at least one element selected from the group consisting of Mn, Ti, Ca, and Al is positioned. The content ratios of Mn, Ti, Ca, and Al positioned at the first surface 151a and the second surface 151b may be greater than the content ratios of Mn, Ti, Ca, and Al positioned in the base member 151 and the covering layer 152.

As a result, the adhesiveness between the base member 151 and the covering layer 152 can be increased. Thus, for example, the base member 151 and the covering layer 152 are less likely to peel off, thereby making the fuel gas leakage less likely to occur. Thus, according to the embodiment, the durability of the support body 15 can be improved, and thus, the durability of the cell stack device 10 can be improved.

Note that the above-described metal elements positioned at the interface between the base member 151 and the covering layer 152 can be positioned as single elements, alloys, or metal oxides. The metal elements may be positioned on either the base member 151 side or the covering layer 152 side, and may be positioned across the base member 151 and the covering layer 152.

The insertion hole 15a of the support body 15 illustrated in FIG. 5B includes a first portion 15A extending in the width direction W (see FIG. 1A) of the cell 1, a second portion 15B bent from the first direction, and a third portion 15C extending in the array direction, in other words, in the thickness direction T (see FIG. 1A), of the cell 1.

In the embodiment, the thickness of the covering layer 152 positioned at the second portion 15B of the support body 15 may be greater than the thicknesses of the covering layer 152 positioned at the first portion 15A and the third portion 15C. Specifically, the thickness t1 (see FIG. 5C) of the covering layer 152 where the first surface 152a is positioned is greater in the second portion 15B than in the first portion 15A and the third portion 15C.

In the second portion 15B of the support body 15 that is bent in a top surface view, stress due to the difference in thermal expansion between the members is more likely to be concentrated as compared with the first portion 15A and the third portion 15C. In this manner, by varying the thickness of the covering layer 152 where the first surface 152a is positioned according to the shape of the support body 15, in particular the insertion hole 15a, in a top surface view, the concentration of stress in the second portion 15B, for example, can be alleviated. Thus, according to the embodiment, the durability of the support body 15 can be improved, and thus, the durability of the cell stack device 10 can be improved.

FIGS. 6A to 6E are enlarged cross-sectional views of bonding portions between metal members according to first to fifth variations of the embodiment and the cells. FIGS. 7A and 7B are enlarged cross-sectional views of bonding portions between metal members as other examples according to sixth and seventh variations of the embodiment and the cells.

Figure 6A:
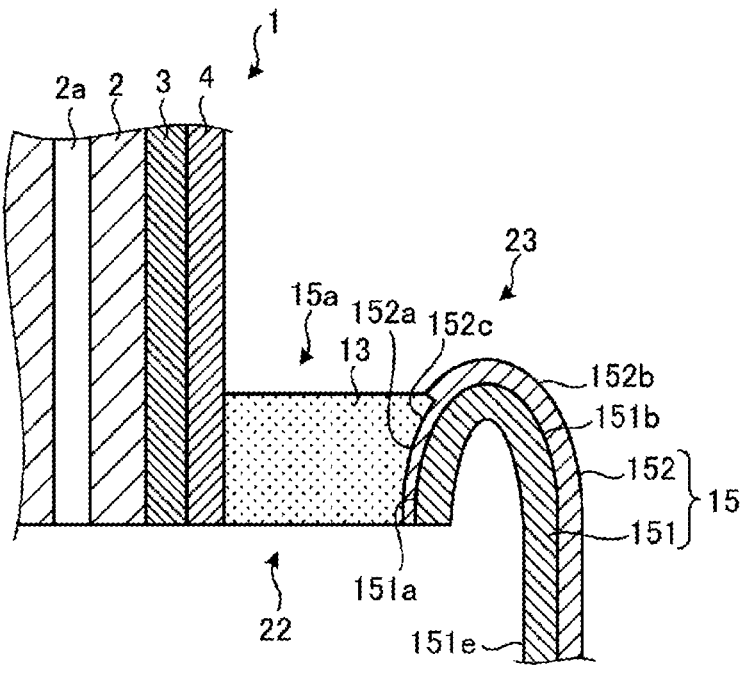
FIG. 6A is an enlarged cross-sectional view of a bonding portion between a metal member according to a first variation of the embodiment and the cell.
Figure 7A:
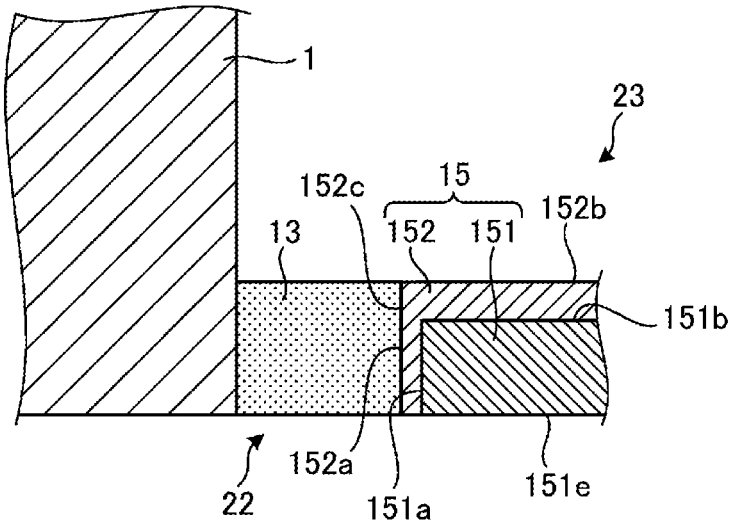
FIG. 7A is an enlarged cross-sectional view of a bonding portion between a metal member as another example according to a sixth variation of the embodiment and the cell.
Figure 7B:
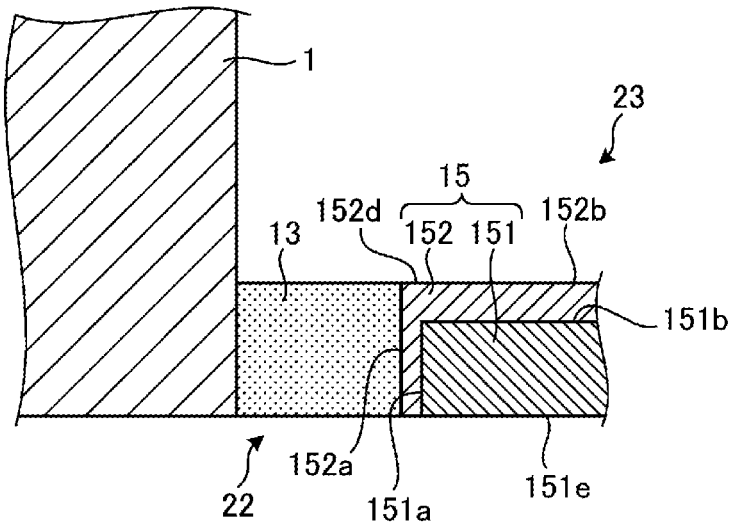
FIG. 7B is an enlarged cross-sectional view of a bonding portion between a metal member as another example according to a seventh variation of the embodiment and the cell.

As illustrated in FIGS. 6A and 7A, the covering layer 152 of the support body 15 may further include an intermediate surface 152c positioned between the first surface 152a and the second surface 152b.

The intermediate surface 152c faces the bonding material 13. The intermediate surface 152c may, for example, have a smaller surface roughness than the first surface 152a. The intermediate surface 152c is positioned at a portion closer to the oxidizing atmosphere than the first surface 152a. Of the covering layer 152 facing the bonding material 13, by making the surface roughness of the intermediate surface 152c smaller than that of the first surface 152a positioned at a portion away from the oxidizing atmosphere, for example, during high-temperature operation, chromium (Cr) contained in the base member 151 can be made less likely to be released into the oxidizing atmosphere (external space 23) via the covering layer 152. Thus, according to the embodiment, the durability of the support body 15 can be improved, and thus, the durability of the cell stack device 10 can be improved. Note that the surface roughness of the covering layer 152 positioned at the intermediate surface 152c may be the same as, for example, the surface roughness of the second surface 152b. The intermediate surface 152c may have, for example, an intermediate surface roughness between the surface roughness of the first surface 152a and the surface roughness of the second surface 152b.

The thickness of the covering layer 152 where the intermediate surface 152c is positioned may be, for example, greater than the thickness of the covering layer 152 where the first surface 152a is positioned. The intermediate surface 152c is positioned at a portion closer to the oxidizing atmosphere than the first surface 152a. Of the covering layer 152 facing the bonding material 13, by making the thickness of the intermediate surface 152c greater than that of the first surface 152a positioned at the portion away from the oxidizing atmosphere, for example, during high-temperature operation, chromium (Cr) contained in the base member 151 can be made less likely to be released into the oxidizing atmosphere (external space 23) via the covering layer 152. Thus, according to the embodiment, the durability of the support body 15 can be improved, and thus, the durability of the cell stack device 10 can be improved. Note that the thickness of the covering layer 152 positioned at the intermediate surface 152c may be the same as, for example, the thickness t2 of the second surface 152b (see FIG. 3B). The intermediate surface 152c may have, for example, an intermediate thickness between the thicknesses t1 and t2.

Figure 6B:
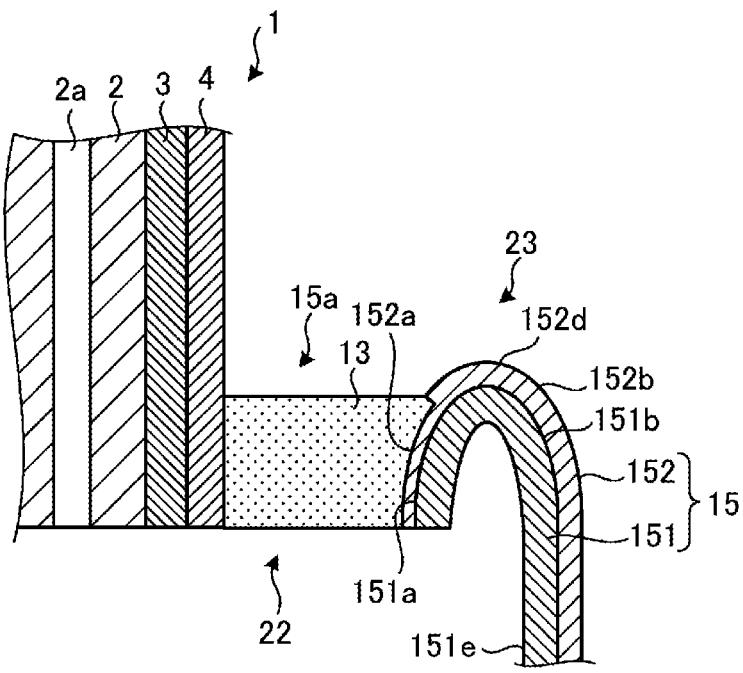
FIG. 6B is an enlarged cross-sectional view of a bonding portion between a metal member according to a second variation of the embodiment and the cell.

On the other hand, as illustrated in FIGS. 6B and 7B, the covering layer 152 of the support body 15 may further include an intermediate surface 152*d* positioned between the first surface 152*a* and the second surface 152*b*.

The intermediate surface 152*d* is exposed to the oxidizing atmosphere (external space 23). The intermediate surface 152*d* has a surface roughness greater than a surface roughness of the second surface 152*b*, for example. Also, when the intermediate surface 152*d* is provided as described above, for example, chromium (Cr) contained in the base member 151 can be made less likely to be released into the oxidizing atmosphere (external space 23) during high-temperature operation. Thus, according to the embodiment, the durability of the support body 15 can be improved, and thus, the durability of the cell stack device 10 can be improved. Note that the surface roughness of the intermediate surface 152*d* may be the same as the surface roughness of the first surface 152*a*, for example. The intermediate surface 152*d* may have an intermediate surface roughness between the surface roughness of the first surface 152*a* and the surface roughness of the second surface 152*b*, for example.

In each of the variations illustrated in FIGS. 6A, 6B, 7A, and 7B, an example is illustrated in which only one of the intermediate surfaces 152*c* and 152*d* is provided, but both the intermediate surfaces 152*c* and 152*d* may be provided.

Figure 6C:
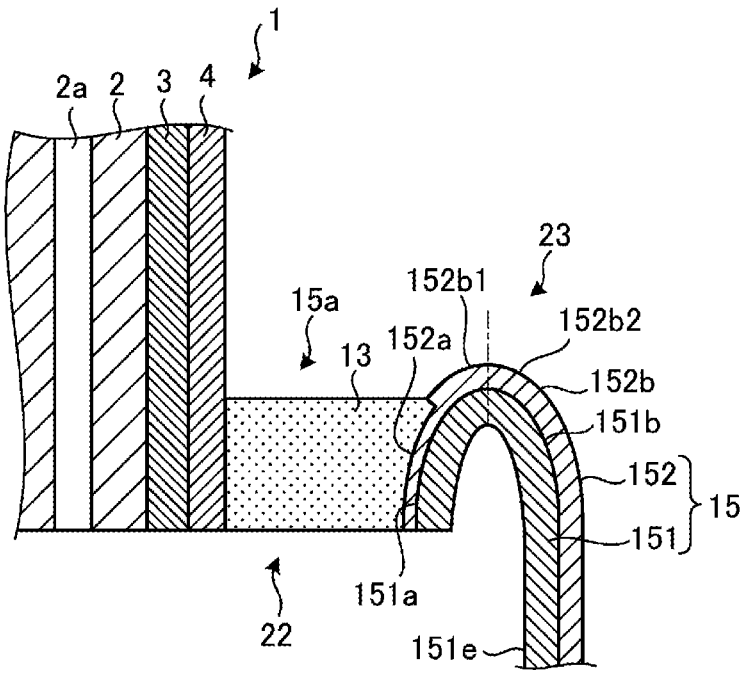
FIG. 6C is an enlarged cross-sectional view of a bonding portion between a metal member according to a third variation of the embodiment and the cell.

As illustrated in FIG. 6C, of the covering layer 152, the second surface 152*b* exposed to the oxidizing atmosphere (external space 23) may include surfaces 152*b*1 and 152*b*2 having different thicknesses of the covering layer 152.

The surface 152*b*2 is positioned away from the element portion of the cell 1 relative to the surface 152*b*1. The surface 152*b*1 closer to the element portion is more likely to be hotter than the surface 152*b*2 away from the element portion, and chromium (Cr) contained in the base member 151 is more likely to be released into the oxidizing atmosphere (external space 23). The thickness of the covering layer 152 where the surface 152*b*1 is positioned can be greater than the thickness of the covering layer 152 where the surface 152*b*2 away from the element portion is positioned.

By making the thickness of the covering layer 152 where the surface 152*b*1 is positioned greater than the thickness of the covering layer 152 where the surface 152*b*2 is positioned, for example, during high-temperature operation, chromium (Cr) contained in the base member 151 can be made less likely to be released into the oxidizing atmosphere (external space 23). Thus, according to the embodiment, the durability of the support body 15 can be improved, and thus, the durability of the cell stack device 10 can be improved.

The surface roughness of the surface 152*b*1 closer to the element portion may be greater than the surface roughness of the surface 152*b*2 away from the element portion. By increasing the surface roughness of the surface 152*b*1, the flow of oxygen-containing gas (air) positioned in the vicinity of the element portion can be changed to increase the residence time of the oxygen-containing gas (air). Thus, according to the embodiment, the reaction efficiency of the cell stack device 10 can be improved because the oxygen uptake by the air electrode 5 can be encouraged.

Note that in the example illustrated in FIG. 6C, a boundary between the surfaces 152*b*1 and 152*b*2 is positioned at the upper end portion of the support body 15, but is not limited thereto. For example, as illustrated in FIG. 2C, the upper surface that can be visually recognized when the cell stack device 10 is viewed in a top surface view may be the surface 152*b*1, and the side surface positioned on the side of the surface 152*b*1 may be the surface 152*b*2. A portion where the temperature reached during high-temperature operation is equal to or greater than a predetermined value may be the surface 152*b*1, and the other portion may be the surface 152*b*2. A portion facing the flow passage (not illustrated) of the oxygen-containing gas (air) may be the surface 152*b*1, and the other portion may be the surface 152*b*2.

Figure 6D:
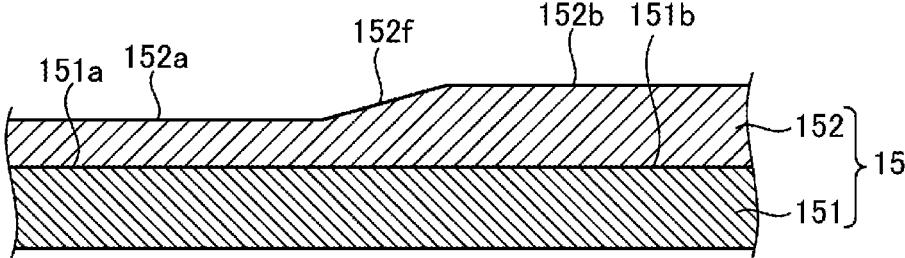
FIG. 6D is a cross-sectional view illustrating a metal member according to a fourth variation of the embodiment.

As illustrated in FIG. 6D, the covering layer 152 of the support body 15 may further include a connecting surface 152*f* positioned between the first surface 152*a* and the second surface 152*b*. The connecting surface 152*f* contiguously connects the first surface 152*a* and the second surface 152*b* by gradually varying the thickness of the covering layer 152. Thus, the durability of the cell stack device 10 can be improved because the covering layer 152 includes the connecting surface 152*f*, which improves the durability of the support body 15.

Note that the connecting surface 152*f* may face the bonding material 13 together with the first surface 152*a*. The connecting surface 152*f* may be exposed to the oxidizing atmosphere (external space 23) together with the second surface 152*b*. The connecting surface 152*f* may have a portion facing the bonding material 13 and a portion exposed to the oxidizing atmosphere (external space 23).

Figure 6E:
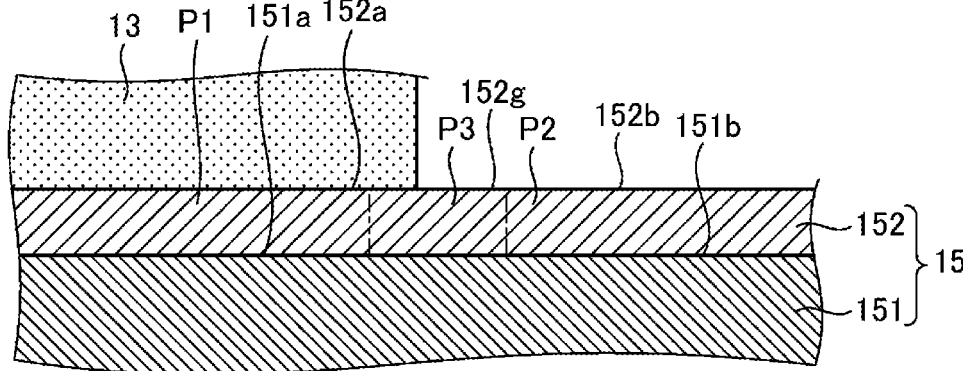
FIG. 6E is a cross-sectional view illustrating a metal member according to a fifth variation of the embodiment.

As illustrated in FIG. 6E, the thickness of the covering layer 152 may be constant. Even in such a case, the durability of the support body 15 can be improved by making the surface roughnesses of the first surface 152*a* and the second surface 152*b* different as described above, and thus, the durability of the cell stack device 10 can be improved. By making the porosities of the covering layer 152 different in portions P1 and P2 where the first surface 152*a* and the second surface 152*b* are positioned, respectively, as described above, the durability of the support body 15 can be improved, thereby improving the durability of the cell stack device 10.

As illustrated in FIG. 6E, a surface 152*g* positioned between the first surface 152*a* and the second surface 152*b* may have an intermediate surface roughness between the surface roughnesses of the first surface 152*a* and the second surface 152*b*. The porosity in a portion P3 of the covering layer 152 where the surface 152*g* is positioned may have an intermediate porosity between the porosities of the portions P1 and P2. By positioning the surface 152*g* in this way, the durability of the support body 15 can be improved, thereby improving the durability of the cell stack device 10.

Figure 8A:
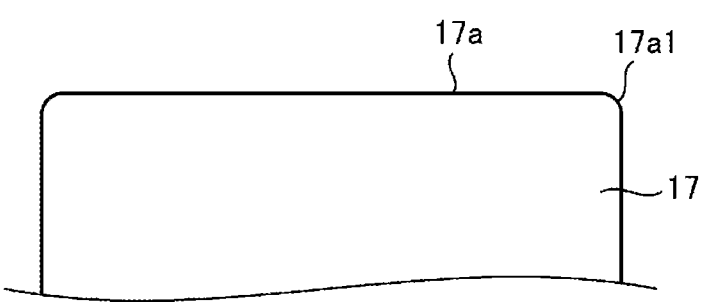
FIG. 8A is a front view illustrating an end current collector according to an eighth variation of the embodiment.
Figure 8B:
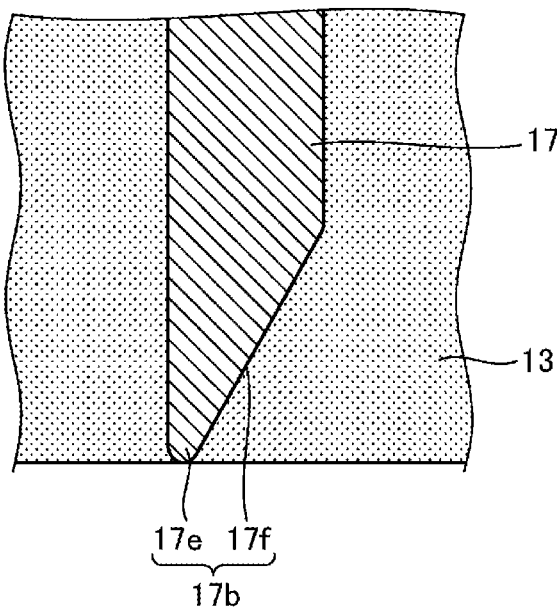
FIG. 8B is a cross-sectional view illustrating an end current collector according to a ninth variation of the embodiment.

FIG. 8A is a front view illustrating an end current collector according to an eighth variation of the embodiment. FIG. 8B is a cross-sectional view illustrating an end current collector according to a ninth variation of the embodiment.

As illustrated in FIG. 8A, an upper end 17*a* of the end current collector 17 that can be visually recognized when viewed from the upper surface may be rounded at a corner portion 17*a*1.

As illustrated in FIG. 8B, a lower end 17*b* of the end current collector 17 is positioned so that the width of an end portion 17*e* is smaller than the thickness of the end current collector 17 by having an end surface 17*f* that is inclined to the direction in which the cells 1 are arrayed. This allows smooth insertion of the end current collector 17 into the bonding material 13 before solidification.

Figure 8C:
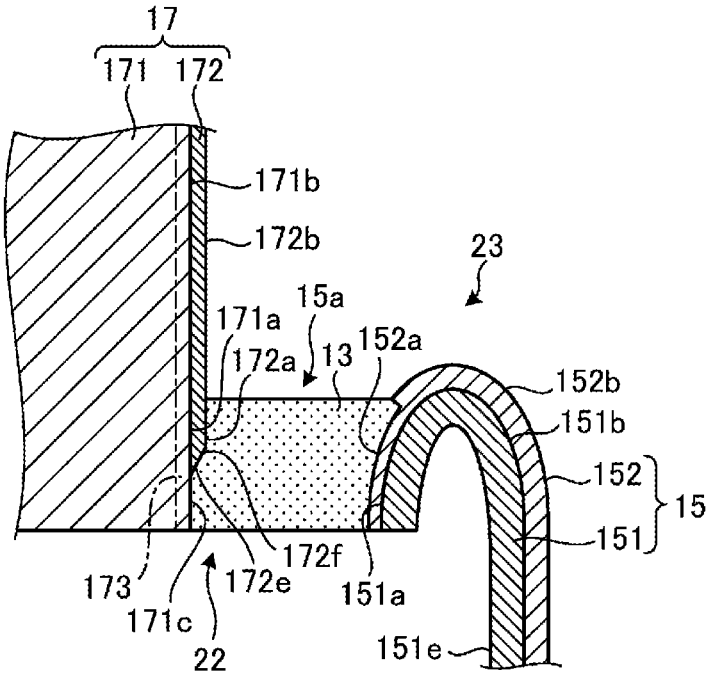
FIG. 8C is an enlarged cross-sectional view of a bonding portion between an end current collector according to a 10th variation of the embodiment and the metal member.
Figure 8D:
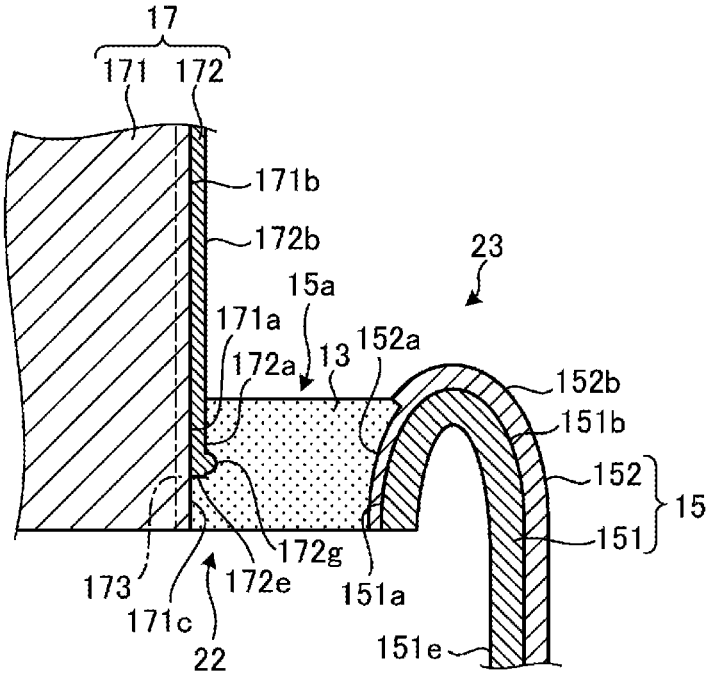
FIG. 8D is an enlarged cross-sectional view of a bonding portion between an end current collector according to an 11th variation of the embodiment and the metal member.

FIGS. 8C and 8D are enlarged cross-sectional views of bonding portions between the end current collectors according to 10th and 11th variations of the embodiment, and the metal members.

As illustrated in FIG. 8C, the covering material 172 may include a surface 172*f* that is positioned at one end (lower end portion) 172e of the covering material 172 of the end current collector 17 and connects the surface 171a (surface 171c) of the base material 171 and the surface 172a of the covering material 172.

As illustrated in FIG. 8D, the covering material 172 may include a protruding portion 172g that is positioned on the one end (lower end portion) 172e side of the covering material 172 of the end current collector 17 and protrudes away from the surface 172a to face the bonding material 13.

Thus, the covering material 172 having the surface 172f or the protruding portion 172g increases the contact area between the covering material 172 and the bonding material 13. This can enhance the durability of the end current collector 17, and can thereby enhance the durability of the cell stack device 10. Note that in FIGS. 8C and 8D, the covering material 172 is illustrated as including the surface 172f or the protruding portion 172g, but the covering material 172 may include the surface 172f and the protruding portion 172g.

Evaluation Method

Here, the thicknesses of each of the surfaces of the support body 15 and the end current collector 17 described above and each of surfaces described later are calculated by image analysis of cross sections perpendicular to the respective surfaces. First, the support body 15 and the bonding material 13, or the end current collector 17 and the bonding material 13 are cut out and embedded in resin. Then, a cross section perpendicular to a surface where the surface roughness is measured is polished using abrasive grains, a wrapping film (approximately #8000), or the like to obtain a mirror-finished cross section. An image of the obtained cross section is captured using a scanning electron microscope (SEM), an optical microscope, or the like, and the thickness of each of the surfaces can be measured by image analysis of the captured image.

The magnitudes of the surface roughnesses of each of the surfaces of the support body 15 and the end current collector 17 described above and each of the surfaces to be described later can be determined based on the arithmetic average roughness Ra prescribed in JIS B0633; 2001. The arithmetic average roughness Ra can be calculated by image analysis of a cross section perpendicular to each of the surfaces in the same way as the thickness of each of the surfaces.

The porosity in each portion of the covering layer 152 can be calculated, for example, as a ratio of the total area of the pores to the area of the entire image by image analysis of an image of a cross section of each portion of the covering layer 152 observed with a scanning electron microscope (SEM).

The content ratio of Mn, Ti, Ca, and Al in each portion of the support body 15 can be confirmed, for example, by cutting or scraping each portion of the support body 15 from the cell 1 and analyzing it by elemental analysis such as ICP emission spectroscopy. The content of Mn, Ti, Ca, and Al can be calculated by elemental analysis of the cross section of the support body 15 using an electron probe microanalyzer (EPMA), wavelength dispersive X-ray spectroscopy (WDS), energy dispersive X-ray spectroscopy (EDS), or the like.

Thickness of Covering Layer

The thickness of the covering layer 152 calculated as described above can be, for example, an average of 2 µm to 400 µm of the entire support body 15.

Surface Roughness of Each Surface

The surface roughness (arithmetic average roughness Ra) of each of the surfaces calculated as described above may be, for example, 0.1 µm to 30 µm. The surface roughness (arithmetic average roughness Ra) of one of the first surface 152a and the second surface 152b may be, for example, 0.1 µm to 30 µm. Each of the surfaces to be described below can have a surface roughness (the arithmetic average roughness Ra) similar to that of each of the above-described surfaces.

Porosity of Covering Layer

The porosities of the covering layer 152 calculated as described above and the covering layer to be described below can be, for example, an average of 10 area % to 40 area % of the entire support body 15.

Note that the covering layer 152 may have a crack having an opening width of 10 µm or less, for example. The bonding material 13 may be positioned inside such a crack. By positioning the bonding material 13 inside the crack, for example, the durability of the support body 15 can be improved, thereby improving the durability of the cell stack device 10.

Content Ratio of Mn, Ti, Ca, and Al

The content ratios of Mn, Ti, Ca, and Al in the support body 15 calculated as described above and a support member to be described below can be, for example, an average of 0.01 mass % to 10 mass % of the entire support body 15. The content ratios of Mn, Ti, Ca, and Al at the interface between the base member 151 and the covering layer 152, the base member 151, and the covering layer 152 can be, for example, 0.1 mass % to 30 mass % (interface), 0.01 mass % to 10 mass % (base member 151), and 0.01 mass % to 10 mass % (covering layer 152), respectively.

Manufacturing Method

The covering layer 152 according to the embodiment can be positioned by a method such as a thermal spraying method, a vapor deposition method, an electrodeposition method, a sputtering method or the like. For example, a covering material may be coated with paint on the surface of the base member 151, and then may be fired to form the covering layer 152.

The first surface 152a and the second surface 152b of the covering layer 152 can be formed, for example, based on a difference between the surface roughnesses of the first surface 151a and the second surface 151b of the base member 151 corresponding to the first surface 152a and the second surface 152b. The first surface 152a and the second surface 152b may be formed by making the thickness of a portion corresponding to the second surface 152b greater than the thickness of a portion corresponding to the first surface 152a. For example, among the surfaces of the covering layer 152, by performing a polishing treatment on the portion corresponding to the second surface 152b, the second surface 152b may be formed, and the remaining portion may form the first surface 152a. Each of the first surface 152a and the second surface 152b may be formed by changing various conditions when forming the above-described covering layer 152. The other surfaces can also be formed by appropriately combining the above-described manufacturing methods of the first surface 152a and the second surface 152b and known methods.

Module

Figure 9:
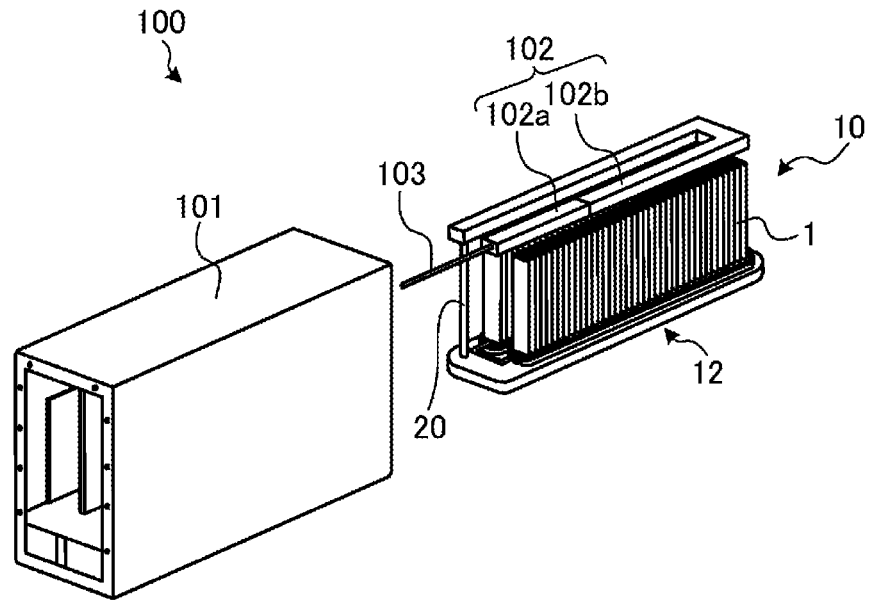
FIG. 9 is an external perspective view illustrating an example of a module according to the embodiment.

A module 100 according to the embodiment of the present disclosure in which the above-described cell stack device 10 is used will be described with reference to FIG. 9. FIG. 9 is an external perspective view illustrating the module according to the embodiment, and illustrates a state in which a front surface and a rear surface, which are parts of a housing container 101, are removed and the cell stack device 10, which is a fuel cell housed inside the module, is extracted to the rear.

As illustrated in FIG. 9, the module 100 includes the housing container 101 and the cell stack device 10 housed in the housing container 101. The reformer 102 is disposed above the cell stack device 10.

The reformer 102 generates a fuel gas by reforming a raw fuel such as natural gas, kerosene or the like, and supplies the fuel gas to the cell 1. The raw fuel is supplied to the reformer 102 through a raw fuel supply pipe 103. The reformer 102 may include a vaporizing unit 102a for vaporizing water and a reforming unit 102b. The reforming unit 102b includes a reforming catalyst (not illustrated) for reforming the raw fuel into a fuel gas. Such a reformer 102 can perform steam reforming, which is a highly efficient reforming reaction.

The fuel gas generated by the reformer 102 is supplied to the gas-flow passage 2a (see FIG. 1A) of the cell 1 through the gas circulation pipe 20, the gas tank 16, and the support member 14.

In the module 100 having the configuration described above, the temperature in the module 100 during normal power generation is about 500° C. to 1000° C. due to combustion of gas and power generation by the cell 1.

With the module 100 having such a configuration, as described above, the module 100 can suppress a deterioration in battery performance by being configured to house the cell stack device 10 that suppresses the deterioration in battery performance.

Module Housing Device

Figure 10:
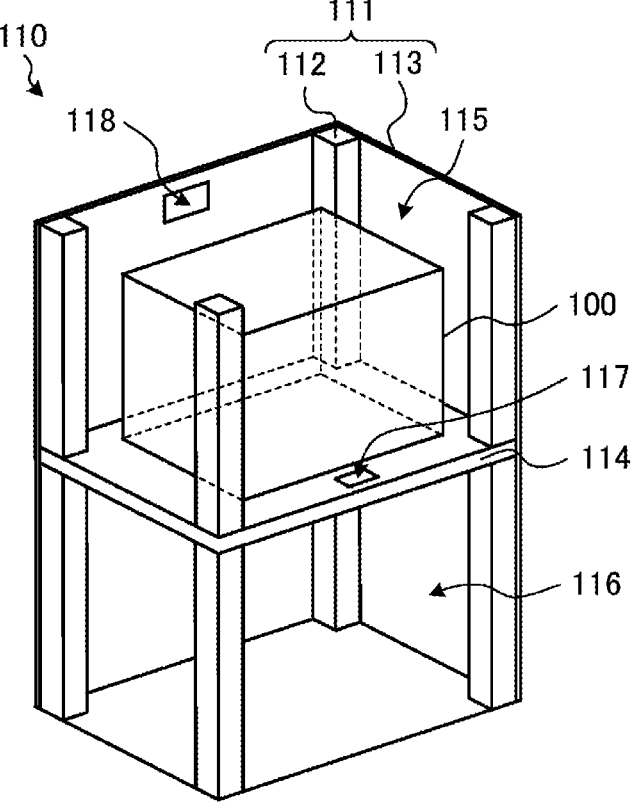
FIG. 10 is an exploded perspective view schematically illustrating an example of a module housing device according to the embodiment.

FIG. 10 is an exploded perspective view illustrating an example of a module housing device according to the embodiment. A module housing device 110 according to the embodiment includes an external case 111, the module 100 illustrated in FIG. 9, and an auxiliary device (not illustrated). The auxiliary device operates the module 100. The module 100 and the auxiliary device are housed within the external case 111. Note that some configurations are not illustrated in FIG. 10.

The external case 111 of the module housing device 110 illustrated in FIG. 10 includes columns 112 and external plates 113. A dividing plate 114 vertically partitions the interior of the external case 111. The space above the dividing plate 114 in the external case 111 is a module housing chamber 115 that houses the module 100, and the space below the dividing plate 114 in the external case 111 is an auxiliary device housing chamber 116 that houses the auxiliary device that operates the module 100. Note that FIG. 10 does not illustrate the auxiliary device housed in the auxiliary device housing chamber 116.

The dividing plate 114 includes an air circulation hole 117 that causes air in the auxiliary device housing chamber 116 to flow into the module housing chamber 115 side. The external plate 113, which constitutes the module housing chamber 115, includes an exhaust hole 118 that exhausts air inside the module housing chamber 115.

With the module housing device 110 having such a configuration, as described above, the module housing device 110 can suppress the deterioration in battery performance by including, in the module housing chamber 115, the module 100 that suppresses the deterioration in battery performance.

Other Variations

Next, cell stack devices according to other variations of the embodiment will be described with reference to FIGS. 11A to 11C.

In the above-described embodiment, a so-called "vertical stripe type" is exemplified in which only one of the element portions each including the fuel electrode, the solid electrolyte layer, and the air electrode is provided on the surface of the support substrate, but the embodiment can also be applied to a horizontal stripe type cell stack device in which so-called "horizontal stripe type" cells are stacked, the cells being provided with the element portions provided at a plurality of locations separated from one another on the surface of the support substrate, respectively, and the adjacent element portions being electrically connected to each other.

In the present embodiment, the hollow and flat plate-shaped support substrate is exemplified, but the embodiment can also be applied to a cell stack device using a cylindrical support substrate. As will be described below, the embodiment can also be applied to a flat plate cell stack device in which so-called "flat plate" cells are stacked in the thickness direction.

In the above-described embodiment, an example is illustrated in which the fuel electrode is provided on the support substrate, and the air electrode is disposed on the surface of the cell, but the embodiment can also be applied to an opposite arrangement, that is, to a cell stack device in which an air electrode is provided on a support substrate and a fuel electrode is disposed on the surface of a cell.

In the above-described embodiment, the "cell", the "cell stack device", the "module", and the "module housing device" are exemplified by the fuel cell, a fuel cell stack device, a fuel cell module, and a fuel cell device, respectively, but they may also be exemplified by an electrolytic cell, an electrolytic cell stack device, an electrolytic module, and an electrolytic device, respectively.

Figure 11A:
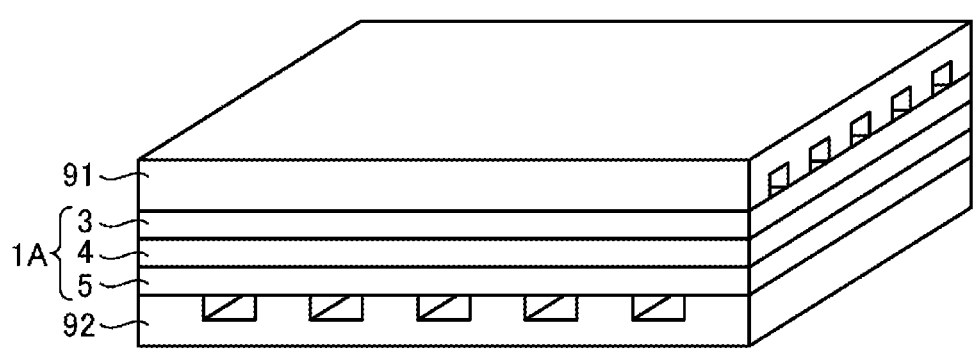
FIG. 11A is a perspective view illustrating a flat plate cell according to a 12th variation of the embodiment.

FIG. 11A is a perspective view illustrating a flat plate cell according to a 12th variation of the embodiment. FIG. 11B is a partial cross-sectional view of the flat plate cell illustrated in FIG. 11A. FIG. 11C is an enlarged view of a region A illustrated in FIG. 11B.

As illustrated in FIG. 11A, the cell stack device includes a cell 1A in which the fuel electrode 3, the solid electrolyte layer 4, and the air electrode 5 are stacked. As illustrated in FIG. 11B, the cell 1A includes an element portion 90 in which the solid electrolyte layer 4 is sandwiched between the fuel electrode 3 and the air electrode 5. In the cell stack device in which a plurality of the flat plate cells are stacked, for example, the element portions 90 included in a plurality of cells 1A are electrically connected to each other by conductive members 91 and 92, which are metal layers disposed adjacent to each other. The conductive members 91 and 92 cause the element portions 90 of the adjacent cells 1A to be electrically connected to each other, and also include a gas-flow passage for supplying gas to the fuel electrode 3 or the air electrode 5.

Figure 11B:
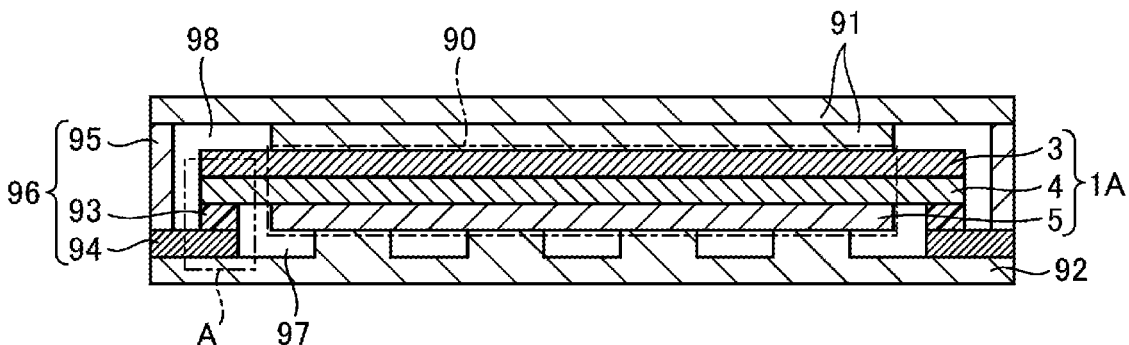
FIG. 11B is a partial cross-sectional view of the flat plate cell illustrated in FIG. 11A.

As illustrated in FIG. 11B, the flat plate cell stack includes a sealing material that hermetically seals a flow passage 98 of the fuel gas and a flow passage 97 of the oxygen-containing gas. The sealing material is a fixing member 96 of the cell, and includes a bonding material 93, and support members 94 and 95, which constitute a frame. The bonding material 93 may be glass, or may be a metal material such as silver solder.

The support member 94 may be a so-called separator that separates the flow passage 98 of the fuel gas and the flow passage 97 of the oxygen-containing gas. The material of the support members 94 and 95 may be, for example, a conductive metal, or may be an insulating ceramic. When the bonding material 93 is, for example, insulating glass, both the support members 94 and 95 may be metal, or one of the support members 94 and 95 may be an insulating material. When the bonding material 93 is a conductive metal, both or one of the support members 94 and 95 may be an insulating material. When the support members 94 and 95 are metal, the support members 94 and 95 may be formed integrally with the conductive member 92.

One of the bonding material 93 and the support members 94 and 95 has insulating properties, and causes the two conductive members 91 and 92 sandwiching the flat plate cell to be electrically insulated from each other.

Figure 11C:
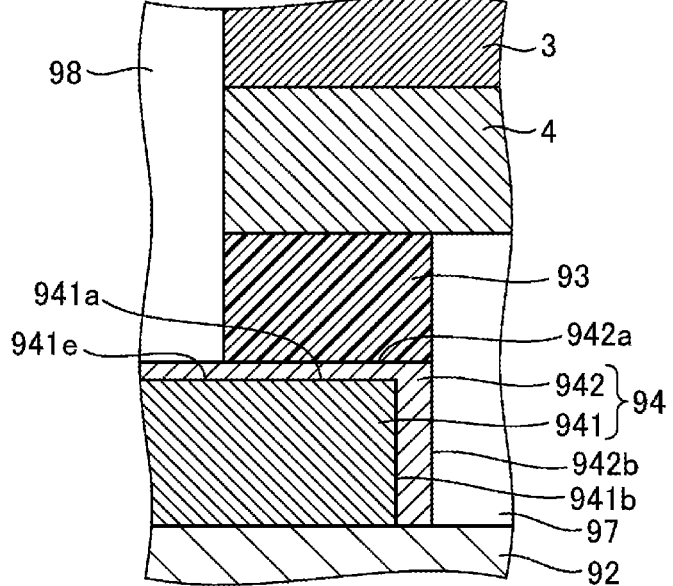
FIG. 11C is an enlarged view of a region A illustrated in FIG. 11B.

The flat plate cell according to the present variation includes the support member 94 and the bonding material 93, as illustrated in FIG. 11C. The support member 94 includes a base member 941 and a covering layer 942. The base member 941 includes a first surface 941a and a second surface 941b, and contains chromium. The covering layer 942 covers the first surface 941a and the second surface 941b of the base member 941. The bonding material 93 is positioned between the solid electrolyte layer 4 of the element portion 90 and a first surface 942a of the covering layer 942.

A second surface 942b of the covering layer 942 is exposed to an oxidizing atmosphere (flow passage 97). The thickness of the covering layer 942 where the second surface 942b is positioned is greater than the thickness of the covering layer 942 where the first surface 942a is positioned. As a result, during high-temperature operation, chromium (Cr) contained in the base member 941 can be made less likely to be released into the oxidizing atmosphere (flow passage 97). Thus, according to the embodiment, the durability of the support member 94 can be improved, and thus, the durability of the cell stack device can be improved.

The surface roughness of the first surface 942a may be greater than the surface roughness of the second surface 942b. Thus, the bonding material 93 can be less likely to peel off from the covering layer 942, or the leakage of the fuel gas can be made less likely to occur due to the breakage of the bonding material 93. Thus, according to the embodiment, the durability of the support member 94 can be improved.

The porosity of the covering layer 942 where the second surface 942b is positioned may be greater than the porosity of the covering layer 942 where the first surface 942a is positioned. As a result, during high-temperature operation, chromium (Cr) contained in the base member 941 can be made less likely to be released into the oxidizing atmosphere (flow passage 97) via the covering layer 942. Thus, according to the embodiment, the durability of the support member 94 can be improved, and thus, the durability of the cell stack device can be improved.

Note that in the example illustrated in FIG. 11C, the covering layer 942 is positioned so as to cover a surface 941e, of the base member 941, facing a reducing atmosphere (flow passage 98). However, the configuration is not limited thereto, and the surface 941e may be exposed to the reducing atmosphere (flow passage 98).

While the present disclosure has been described in detail, the present disclosure is not limited to the above-described embodiment, and various changes, improvements, and the like can be made without departing from the gist of the present disclosure.

As described above, the cell stack device 10 according to the embodiment includes the plurality of cells 1, the metal member (base member 151), the covering layer 152, and the bonding material 13. The plurality of cells 1 include the first cell and each of which includes the element portion. The metal member (base member 151) contains chromium. The covering layer 152 covers the metal member (base member 151). The bonding material 13 is positioned between the first cell and the covering layer 152. The cell stack device 10 satisfies any one of (1) to (3). (1) The covering layer 152 includes at least two portions having different thicknesses or different surface roughnesses at different positions. (2) The surface roughness of the covering layer 152 is different from the surface roughness of the metal member. (3) At least one element selected from the group consisting of Mn, Ti, Ca, and Al is positioned at the interface between the metal member and the covering layer, and the content ratio of the at least one element selected from the group consisting of Mn, Ti, Ca, and Al at the interface is different from the content ratio of Mn, Ti, Ca, and Al of the metal member or the covering layer. This can enhance the durability of the cell stack device 10.

The module 100 according to the embodiment includes the cell stack device 10 described above, and the housing container 101 that houses the cell stack device 10. As a result, the module 100 can be obtained that suppresses the deterioration in battery performance.

The module housing device 110 according to the embodiment includes the module 100 described above, the auxiliary device for operating the module 100, and the external case that houses the module 100 and the auxiliary device. As a result, the module housing device 110 can be obtained that suppresses the deterioration in battery performance.

Note that the embodiment disclosed herein is exemplary in all respects and not restrictive. Indeed, the above-described embodiment can be embodied in a variety of forms. The above-described embodiment may be omitted, replaced, or changed in various forms without departing from the scope of the appended claims and the purpose thereof.

The invention claimed is:

1. A cell stack device comprising:
a plurality of cells comprising a first cell and each of the plurality of cells comprising an element portion;
a metal member containing chromium;
a covering layer covering the metal member; and
a bonding material positioned between the first cell and the covering layer, wherein
(1) the covering layer comprises at least two portions having different thicknesses or different surface roughnesses at different positions, or
(2) a surface roughness of the covering layer is different from a surface roughness of the metal member, or
(3) at least one element selected from group consisting of Mn, Ti, Ca, and Al is positioned at an interface between the metal member and the covering layer, and a content ratio of the at least one element selected from the group consisting of Mn, Ti, Ca, and Al at the interface is different from a content ratio of Mn, Ti, Ca, and Al of the metal member or the covering layer, wherein
the covering layer comprises a second outer surface exposed to an oxidizing atmosphere and a first outer surface positioned away from the oxidizing atmosphere, and
a thickness of the covering layer at which the second outer surface is positioned is greater than a thickness of the covering layer at which the first outer surface is positioned,
a thickness of the covering layer at which the second outer surface is positioned is greater in a portion facing a flow passage of an oxygen-containing gas than in a portion positioned away from the flow passage.

2. The cell stack device according to claim 1, wherein
a thickness of the covering layer at which the second outer surface is positioned is greater in a portion closer to the element portion than in a portion away from the element portion.

3. The cell stack device according to claim 1, wherein the covering layer at which the second outer surface is positioned has a greater porosity than the covering layer at which the first outer surface is positioned.

4. The cell stack device according to claim 1, wherein the metal member comprises an upper surface and a side surface, and a thickness of the covering layer covering the upper surface is greater than a thickness of the covering layer covering the side surface.

5. The cell stack device according to claim 1, wherein the metal member comprises a hole configured to fix the first cell, an edge of the hole comprises a straight portion and a bent portion bending from the straight portion, and a thickness of the covering layer covering the bent portion is greater than a thickness of the covering layer covering the straight portion.

6. The cell stack device according to claim 1, wherein the covering layer has a greater surface roughness than the metal member.

7. The cell stack device according to claim 1, wherein the covering layer comprises a fourth outer surface exposed to an oxidizing atmosphere and a third outer surface positioned away from the oxidizing atmosphere, the bonding material is positioned between the first cell and the third outer surface, and a surface roughness of the fourth outer surface is greater in a portion facing a flow passage of an oxygen-containing gas than in a portion positioned away from the flow passage.

8. The cell stack device according to claim 1, wherein the covering layer comprises a fourth outer surface exposed to an oxidizing atmosphere and a third outer surface positioned away from the oxidizing atmosphere, the bonding material is positioned between the first cell and the third outer surface, and a surface roughness of the fourth outer surface is greater in a portion closer to the first cell than in a portion away from the first cell.

9. The cell stack device according to claim 1, wherein the at least one element selected from the group consisting of Mn, Ti, Ca, and Al is positioned at the interface between the metal member and the covering layer, and the content ratio of the at least one element selected from the group consisting of Mn, Ti, Ca, and Al positioned at the interface is greater than content ratio of Mn, Ti, Ca, and Al positioned in the metal member and the covering layer.

10. A module comprising:

the cell stack device according to claim 1; and a housing container configured to house the cell stack device.

11. A module housing device comprising:

the module according to claim 10;

an auxiliary device configured to operate the module; and an external case configured to house the module and the auxiliary device.

12. A metal member with a covering layer comprising:

a metal member containing chromium; and a covering layer covering the metal member, the covering layer comprising a second outer surface exposed to an oxidizing atmosphere and a first outer surface positioned away from the oxidizing atmosphere, wherein (1) a thickness of the covering layer at which the second outer surface is positioned is greater than a thickness of the covering layer at which the first outer surface is positioned, or a surface roughness of the second outer surface is smaller than a surface roughness of the first outer surface, or (2) the covering layer is in contact with a first surface and a second surface of the metal member, and a surface roughness of the first outer surface of the covering layer is greater than a surface roughness of at least one of the first surface and the second surface of the metal member, wherein a thickness of the covering layer at which the second outer surface is positioned is greater in a portion facing a flow passage of an oxygen-containing gas than in a portion positioned away from the flow passage.

13. The metal member with the covering layer according to claim 12, wherein the covering layer at which the second outer surface is positioned has a greater porosity than the covering layer at which the first outer surface is positioned.

14. The metal member with the covering layer according to claim 12, wherein the covering layer positioned between the second outer surface and the metal member has a greater porosity than the covering layer positioned between the first outer surface and the metal member.

* * * * *